United States Patent
Kumar et al.

(10) Patent No.: US 10,560,959 B2
(45) Date of Patent: Feb. 11, 2020

(54) SPREADING OPTIONS FOR NON-ORTHOGONAL MULTIPLE ACCESS

(71) Applicant: Intel IP Corporation, Santa Clara, CA (US)

(72) Inventors: Utsaw Kumar, Santa Clara, CA (US); Hwan-Joon Kwon, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/068,754

(22) PCT Filed: Nov. 30, 2016

(86) PCT No.: PCT/US2016/064201
§ 371 (c)(1),
(2) Date: Jul. 9, 2018

(87) PCT Pub. No.: WO2017/139005
PCT Pub. Date: Aug. 17, 2017

(65) Prior Publication Data
US 2019/0029031 A1   Jan. 24, 2019

Related U.S. Application Data

(60) Provisional application No. 62/293,285, filed on Feb. 9, 2016.

(51) Int. Cl.
*H04W 72/12* (2009.01)
*H04W 28/02* (2009.01)
(Continued)

(52) U.S. Cl.
CPC ... *H04W 72/1284* (2013.01); *H04W 28/0278* (2013.01); *H04B 1/713* (2013.01); *H04L 67/12* (2013.01)

(58) Field of Classification Search
CPC .......... H04W 72/1284; H04W 28/0278; H04L 5/003; H04L 5/0064
See application file for complete search history.

(56) References Cited

U.S. PATENT DOCUMENTS 10,003,389 B2 * 6/2018 Kusunoki ............ H04B 7/0456
2002/0114398 A1 * 8/2002 Lin ...................... H04L 1/0003
375/253

(Continued)

FOREIGN PATENT DOCUMENTS

EP         1814236 A1    8/2007

OTHER PUBLICATIONS

International Search Report dated May 15, 2017 for International Application PCT/US2016/064201.
(Continued)

*Primary Examiner* — Mohammad S Anwar
(74) *Attorney, Agent, or Firm* — Eschweiler & Potashnik, LLC

(57) ABSTRACT

A network device (e.g., an evolved Node B (eNB), user equipment (UE) or the like) can operate to enable scheduling of transmissions within physical resource blocks (PRBs) as a non-orthogonal multiple access (NOMA) zone and as an orthogonal multiple access (OMA) zone to enable multiplexing UEs over a long term evolution (LTE) or next generation (NextGen) 5G based network for uplink transmissions. A first UE of the UEs can be scheduled to generate uplink transmissions from PRBs within the NOMA zone without an explicit grant message based on predefined threshold of a first transmission packet size or a first transmission rate. Another UE can also be scheduled to utilize resources of the NOMA zone or the OMA zone based on the predefined threshold.

21 Claims, 8 Drawing Sheets

(51) Int. Cl.
*H04B 1/713* (2011.01)
*H04L 29/08* (2006.01)

(56) References Cited

U.S. PATENT DOCUMENTS

| | | | |
|---|---|---|---|
| 2003/0112744 A1* | 6/2003 | Baum | H04L 1/0015 370/206 |
| 2008/0064431 A1* | 3/2008 | Zangi | H04L 1/0026 455/522 |
| 2012/0057535 A1* | 3/2012 | Zhang | H04W 72/04 370/329 |
| 2014/0192767 A1 | 7/2014 | Au et al. | |
| 2016/0270053 A1* | 9/2016 | Zeng | H04W 72/048 |

OTHER PUBLICATIONS

Dai, Linglong et al. "Non-Orthogonal Multiple Access for 5G: Solutions, Challenges, Opportunities, and Future Research Trends." IEEE Communications Magazine. Sep. 2015. 8 pages.

* cited by examiner

SPREADING OPTIONS FOR NON-ORTHOGONAL MULTIPLE ACCESS

REFERENCE TO RELATED APPLICATIONS

This application is a National Phase entry application of International Patent Application No. PCT/US2016/064201 filed Nov. 30, 2016, which claims priority to U.S. Provisional Application 62/293,285 filed on Feb. 9, 2016, entitled "SPREADING OPTIONS FOR NON-ORTHOGONAL MULTIPLE ACCESS" in the name of Utsaw Kumar et al. and is hereby incorporated by reference in its entirety.

FIELD

The present disclosure relates to non-orthogonal multiple access in wireless communications, and more specifically, to spreading options for non-orthogonal multiple access.

BACKGROUND

Conventional third generation (3G) and fourth generation (4G) wireless systems use radio access technologies (RATs) that employ orthogonal multiple access (OMA) as multiple access techniques, such as code division multiple access (CDMA) in 3G and orthogonal frequency division multiple access (OFDMA) in 4G. OMA techniques involve transmitting to multiple user equipments (UEs) with full power, but a split bandwidth, for example, via the frequency division of OFDMA, the code division of CDMA, or time division (e.g., in time division multiple access (TDMA)). However, mobile data traffic is expected to increase exponentially over the next decade, outstripping the ability of OMA technologies to meet mobile data traffic demands.

Multiple access refers to how a network device (e.g., an eNB) multiplexes multiple users through limited resources, such as a time resource, frequency resource, spatial resource or other network spectrum resources such as physical resource blocks (PRBs) or the like for wireless or mobile communications. Multiple access is one of the key design aspects of cellular networks, which often significantly affects performance metrics such as throughput, the number of supportable users, latency, etc. The choice of the multiple access scheme is often driven by ease of implementation and main applications like data, voice, small packets, etc. In general, multiple access can be broadly divided classified into orthogonal and non-orthogonal schemes. In OMA, different users are allocated orthogonal or non-conflicting resources in time, frequency or both. In the absence of inter-user interference, low-complexity detection schemes can be employed at the receiver. In fourth generation mobile systems, OFDMA and single carrier frequency division multiple access (SC-FDMA) schemes are used for multiple access, which are examples of orthogonal schemes. Unlike OMA, in non-orthogonal multiple access schemes (NOMA), users share resources and receivers might employ advanced multi-user detection schemes to retrieve data. Examples of NOMA can be CDMA, low Density Spreading (LDS), SCMA, etc. Next generation mobile communication is supposed to support a wide variety of traffic—low latency, delay tolerant, small packets, huge packets, etc.

Next generation mobile communications are predicted to support a wide variety of traffic—low latency, delay-tolerant, small packets, huge packets, etc. Current Long Term Evolution Advanced (LTE-A) is not necessarily designed to support all these applications simultaneously. However, multiple access schemes can be employed with a focus on small packet enhancements, for e.g., machine type communications (MTC), machine-to-machine (M2M), gaming, etc. Signaling overhead, latency and complexity become major design considerations when optimizing uplink transmission of small data packets because of the payload to control overhead ratio. Some multiple access schemes can be engineered to enjoy the benefit of minimal change from existing Long Term Evolution (LTE) systems, while providing benefits in terms of user multiplexing, latency reduction and downlink/uplink control overhead reduction.

DETAILED DESCRIPTION

Figure 1:
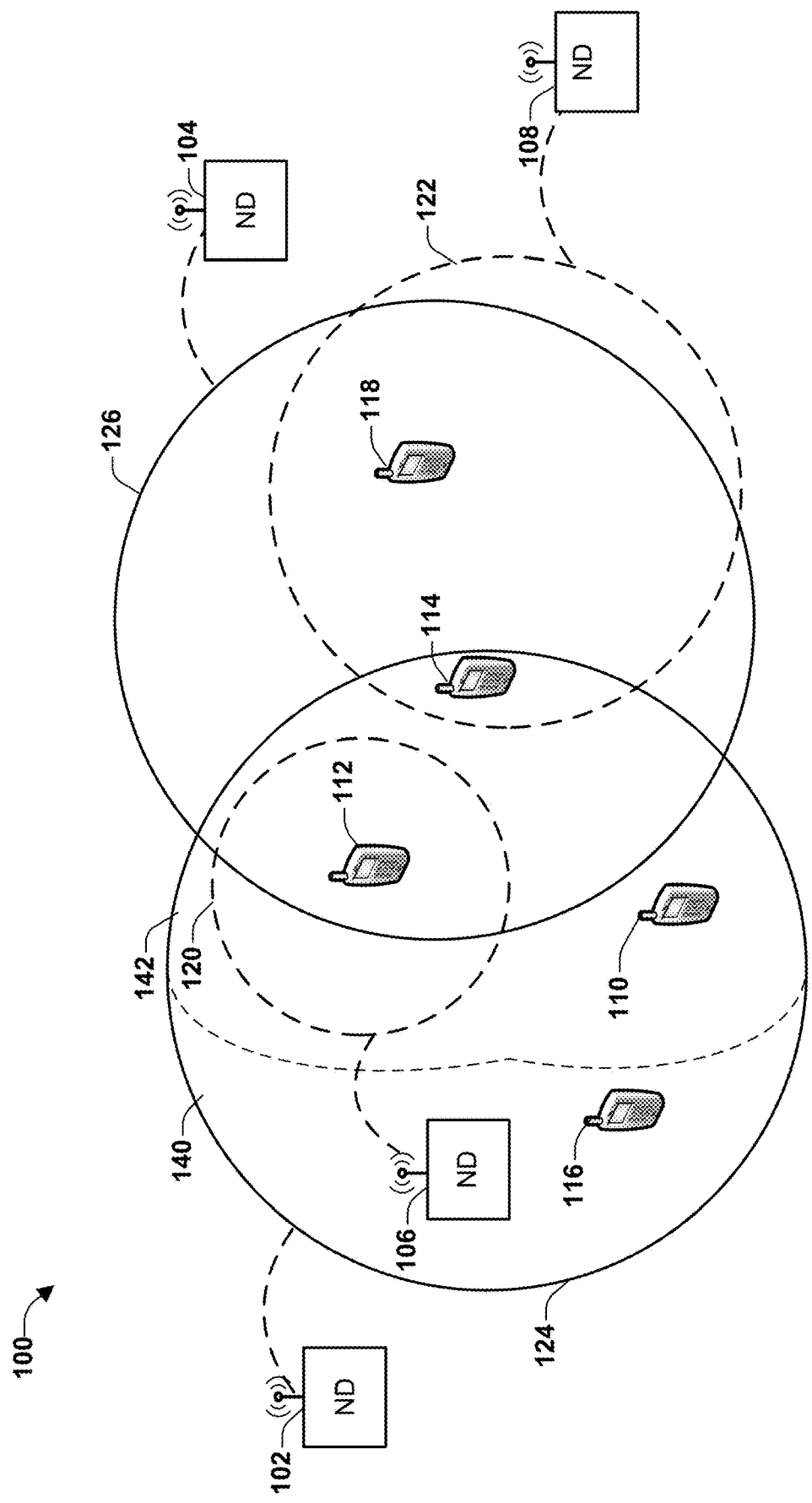
FIG. 1 illustrates a block diagram illustrating an example wireless communications network environment for a UE or eNB according to various aspects or embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, a circuit, circuitry or a circuit element, an object, an executable, a program, a storage device, a computer, a tablet PC and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components or elements without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

Overview

In consideration of the above described deficiencies, various components and techniques are disclosed that enable networks devices (e.g., eNBs) to schedule other network devices (e.g., UEs) between transmission grants (e.g., UL grants) and transmissions (e.g., UL transmissions), which include signaling operations, UL listen before talk (LBT) operations, or extension of multi-carrier UL scheduling in unlicensed spectrums/bands or licensed spectrums/bands. Network devices described in this disclosure can enable multiple access schemes that can be employed for uplink access with a focus on small packet enhancements, such as for applications including machine type communications, gaming, internet of things (IoT) communications, or the like. Signaling overhead, latency and complexity become major design considerations when optimizing uplink transmission of small data packets because of the payload to control data overhead ratio. In particular, synchronous multiple access schemes enjoy the benefit of minimal change from existing LTE systems, while providing benefits in terms of user multiplexing, latency reduction and downlink/uplink control overhead reduction.

In one example, uplink non-orthogonal multiple access in synchronous systems can be designed to reserve resources (e.g., frequency, time or physical resource block resources, resource elements, etc.) for uplink, which the uplink users (or UEs) could share. In particular, at least a portion of these assigned resources can be referred to as the NOMA zone of a physical channel. An eNB (or base station) can statically or semi-statistically configure Orthogonal Multiple Access (OMA) and NOMA regions (or zones) in a time division multiple access (TDMA), frequency division multiple access (FDMA), or a combination manner. The NOMA zone can be transparent to the UEs connected to the cell. Once a UE is assigned to some NOMA region(s) and rate(s), the UE can send data at or below the assigned NOMA rate via the NOMA region without an additional explicit grant from eNB and modify resources within the NOMA region without making a request for a grant (e.g., an uplink/transmission/scheduling grant) or obtaining a further grant for transmission. This process or procedure can reduce latency and control overhead. When the UE needs to transmit data at a higher rate (or large packet size) than the assigned NOMA rate, it can request an explicit grant for OMA transmission (e.g., explicit PRBs, modulation and coding schemes (MCSs), etc.) to then generate transmission along LTE operations.

In one embodiment, an eNB can multiplex UEs in a downlink transmission for scheduling uplink transmissions via NOMA zones based on a predefined threshold such as an IoT threshold. The IoT threshold can be designated or correspond to an IoT standard, IoT protocol or other machine to machine communication such as the machine type communication (MTC) or massive MTC (mMTC) standards, generally referred to herein as IoT. The IoT threshold can represent a particular range or value, including a transmission rate, a packet size, or other resource parameter utilized in MTC or IoT protocol standards, for example.

By designating a NOMA zone for one or more UEs connected to the network (e.g., an LTE or a next generation (NextGen) 5G based network), the eNB can enable UEs to modify the resources or PRBs used within the NOMA zone without first making a request or signalling for a UL grant or the modification of a radio bearer. UEs of the network can further signal a request for a grant message to enable the utilization of an OMA zone of a physical channel (e.g., physical uplink control channel or other physical channel implemented at a Physical layer) from a NOMA zone when the transmission rate or packet size of the IoT standard increases above that of the IoT threshold.

UEs of the network can facilitate or enable a self-admission control via Listen Before Talk (LBT). Here, the UE can measure the energy in the NOMA zone and transmit within the NOMA zone if the measured energy is below a certain pre-defined threshold. If the energy or measurement of the NOMA zone of a network channel is not within a threshold level, then a back off operation can be enabled, in which the UE performs a random or fixed back-off before re-testing for a measured energy.

In other embodiments, UEs of a network can operate contention protocols for the physical uplink shared channel (PUSCH) resources or PRBs of the NOMA zone among one another when two or more UEs attempt to signal or transmit on the same resource or PRB of the NOMA zone. In particular, UEs can be assigned a particular set of resources or PRBs within PUSCH for the NOMA zone and operate contention based protocols that can include LBT operations, backoff, token sharing, handshaking, collision detection/avoidance, or other rule-based exchange for sharing the same resources of the channel. The remaining operations can be similar to LTE or NextGen standards. It is assumed here that because small packet transmissions are intermittent and infrequent, the collision probability is also likely small, especially with machine to machine or IoT communications of machine networks.

In other aspects, UEs can generate or provide direct spreading with one or more different multiple codes from among one another. UEs can use orthogonal codes (e.g., Zadoff-Chu sequences) to transmit on the same set of resources within a NOMA zone in a channel. Additionally, PRB based spreading can also be generated over the entire NOMA zone, in which the data transmitted from UEs can be spread over the whole bandwidth, either by repetition or rate matching. Additional aspects and details of the disclosure are further described below with reference to figures.

FIG. 1 illustrates an example non-limiting wireless communications environment 100 that can facilitate or enable configuring PRBs of a physical channel over a network in a NOMA zone and an OMA zone via communications between an eNB and UEs. The wireless communications environment 100 can include a multitude of wireless communication networks, each having a respective coverage area that can operate to serve different UEs that utilize different zones (e.g., NOMA zones and OMA zones), and alternate among different multiple access operations depending upon the network or change in transmission parameters (e.g., transmission rate, packet size or the like).

Wireless communications environment 100 can include one or more cellular broadcast servers or macro cell network devices 102, 104 (e.g., base stations, eNBs, access points (APs) or the like) and one or more small cell network devices or APs (e.g., small eNBs, micro-eNBs, pico-eNBs, femto-eNBs, home eNBs (HeNBs), or Wi-Fi nodes) 106, 108 deployed within the wireless communications environment 100 and servicing one or more UE devices 110, 112, 114, 116, 118. Each wireless communications network (e.g., cellular broadcast servers 102, 104 and small cell network devices 106, 108) can comprise one or more network devices (e.g., a set of network devices (NDs)) that operate in conjunction in order to process network traffic for the one or more UE devices 110, 112, 114, 116, or 118. For example, macro cell NDs 102, 104 can comprise a set of network devices that are cellular enabled network devices. In another example, the small cell network devices 106, 108 can include a set of network devices that operate with a smaller coverage zone than the macro cell network devices 102 and 102, for example.

Although NDs 106 and 108 are described as small cell network devices, they can also be Wi-Fi enabled devices or wireless local area network (WLAN) devices, as well as macro cell network devices, small cell network devices, or some other type of ND operable as a base station, eNB, or secondary cell network device for example. Alternatively one or more of the macro cell NDs 102 and 104 could be small cell network devices or other NDs of a different radio access technology (RAT) that operate with different frequency carriers, for example.

As illustrated, each of the one or more Wi-Fi access points 106, 108 can have a corresponding service area 120, 122. Additionally, each of the one or more cellular broadcast servers or macro cell NDs 102, 104 can have a corresponding service area 124, 126. However, it should be understood that the wireless communications environment 100 is not limited to this implementation. For example, any number of APs or NDs with respective service areas can be deployed within the wireless communications environment 100. Further, any number of cellular broadcast servers and respective service areas can be deployed within the wireless communications environment 100 as well.

Although only five UE devices 110, 112, 114, 116, 118 are illustrated, any number of UE devices can be deployed within the wireless communications environment 100 as well. A UE device can contain some or all of the functionality of a system, subscriber unit, subscriber station, mobile station, mobile, wireless terminal, device, mobile device, remote station, remote terminal, access terminal, user terminal, terminal, wireless communication device, wireless communication apparatus, user agent, user device, or other ND, for example.

In one aspect, cellular broadcast servers or macro cell NDs 102, 104, small cell NDs 106, 108 or UEs 110, 112, 114, 116, 118 can monitor their surrounding radio conditions (e.g., by employing respective measurement components). For example, each of the macro cell NDs 102, 104 and small cell NDs 106, 108 can determine network traffic load on its respective network by performing a network diagnostic process. As an example, during a network listen procedure (e.g., a listen before talk operation with or without a back-off operation), macro cell NDs 102, 104, small cell NDs 106, 108 or UE devices 110, 112, 114, 116, 118 can scan their radio environment to determine network performance statistics or network parameters (e.g., frequency, SNR, signal quality, QoS, QoE, load, congestion, signal rate, etc.). Various parameters associated with macro cell NDs 102, 104 and small cell NDs 106, 108 can be detected during the network diagnostic procedure or measurements by the UE devices, such as, but not limited to, frequency bands, scrambling codes, common channel pilot power, bandwidth across respective networks, universal mobile telecommunications system terrestrial radio access receive signal strength indicator, as well as frequency carrier priorities for particular cell groups (e.g., a normal group or a reduced group), packet size, transmission rates and so on.

In an example scenario, NDs 102, 104, small cell NDs 106, 108, or UEs 110, 112, 114, 116, 118 can be machine devices on a network that is an IoT network, part of an LTE or NextGen 5G network that communicates via an IoT or MTC standard/protocol, LTE standard, or 5G network standard protocols. The UE device 110, for example, can communicate over the network via a NOMA zone resource such as a PRB within a set of designated PRBs corresponding to a NOMA zone of a physical channel. The UE device 110, for example, can modify the resources from one PRB to another within the NOMA zone without receiving an explicit grant from another ND (e.g., eNB 102).

In an aspect, the NOMA zone can be utilized by the UE 110 based on a predefined threshold or condition. For example, as long as the transmission rate or packet size is below a certain amount, then the UE 110 can transmit data via NOMA or PRB resources of the NOMA zone. In other words, as long as the UE 110 transmits within an IoT standard or protocol then the NOMA zone resources can be used to transmit without an explicit grant or bearer change request. However, once the transmission rate, packet size or other parameter of the cell network corresponds to an LTE standard or NextGen standard size or rate, then PRBs of an OMA zone can then govern the communications from the UE, in which a grant or bearer change becomes contingent for ongoing communication transmission over the network. Thus, once the transmission rate or packet size increases over a predefined threshold, the UE can request a grant for a PRB within an OMA zone of the physical channel within a physical layer or higher layer.

In an aspect, the network 124 corresponding to the service area generated by eNB 102 can include different networks depending on the synchronous connection of the UE device (110 or 116) with the eNB 102. For example, the network or service area 124 can include portions of a network or service area 140 operating as a synchronous network, in which the UE 116 is synchronously connected thereat with a band or CC, and network 142 operating as an asynchronous network, in which the UE 110 is asynchronously connected thereat with a band or CC. In a synchronous connection, such as with the UE 116 to the eNB 102, the clocking of the data can be transmitted with data together, in the asynchronous connection, such as with the UE 110 and the eNB 102, the clocking mechanisms or times are independent of one another between receiver and transmitter of the UE 110 and eNB 102, for example.

As such, for UEs 116 and 110 within the network service area 124, the UE 116 can be configured by the eNB 102 to operate within a NOMA zone or an OMA zone based on the predefined threshold as discussed above. While at the same time, or concurrently, the UE 110 on the network 124 can be configured by the eNB 102 to operate with only an OMA resource. As such, UEs 116 coupled to the network via a synchronous network connection 140 can be enable or signaled by the eNB 102 to utilize or transmit within the NOMA zone or the OMA zone based on the predefined threshold, while UEs on an asynchronous network connection 142 being enabled to only operate via OMA schemes or PRB resources.

The eNB 102, for example, can communicate the reference signals for the UE to measure. At each measurement sample, measurements could comprise any network measurement of network conditions related to the frequency band, network device operating (communicating) the frequency band, or channel conditions, such as a signal strength, a channel quality, a signal-to-noise-plus interference ratio (SINR), a received signal strength indictor (RSSI) or other measurement such as a reference signal received power (RSRP), a reference signal received quality (RSRQ), or the like. The UE can then generate channel state information (CSI), one or more channel quality indicators (CQIs) or the like to a transmission path for transmission based on one or more of the measurements. The synchronous signals can be sent periodically by each eNB or ND 102, 104, for example, and some of the network could be synchronized (e.g., at 140) and some asynchronized (e.g., 142), but within the 6 ms of a measurement gap the UEs 116 or 110 can be expected, for example, to be able to determine at least one of the synchronized signals from neighboring cells by communicating or measuring cells via resources granted by the eNB 102 to the UEs for measuring, reports, or other uplink transmissions.

Figure 4:
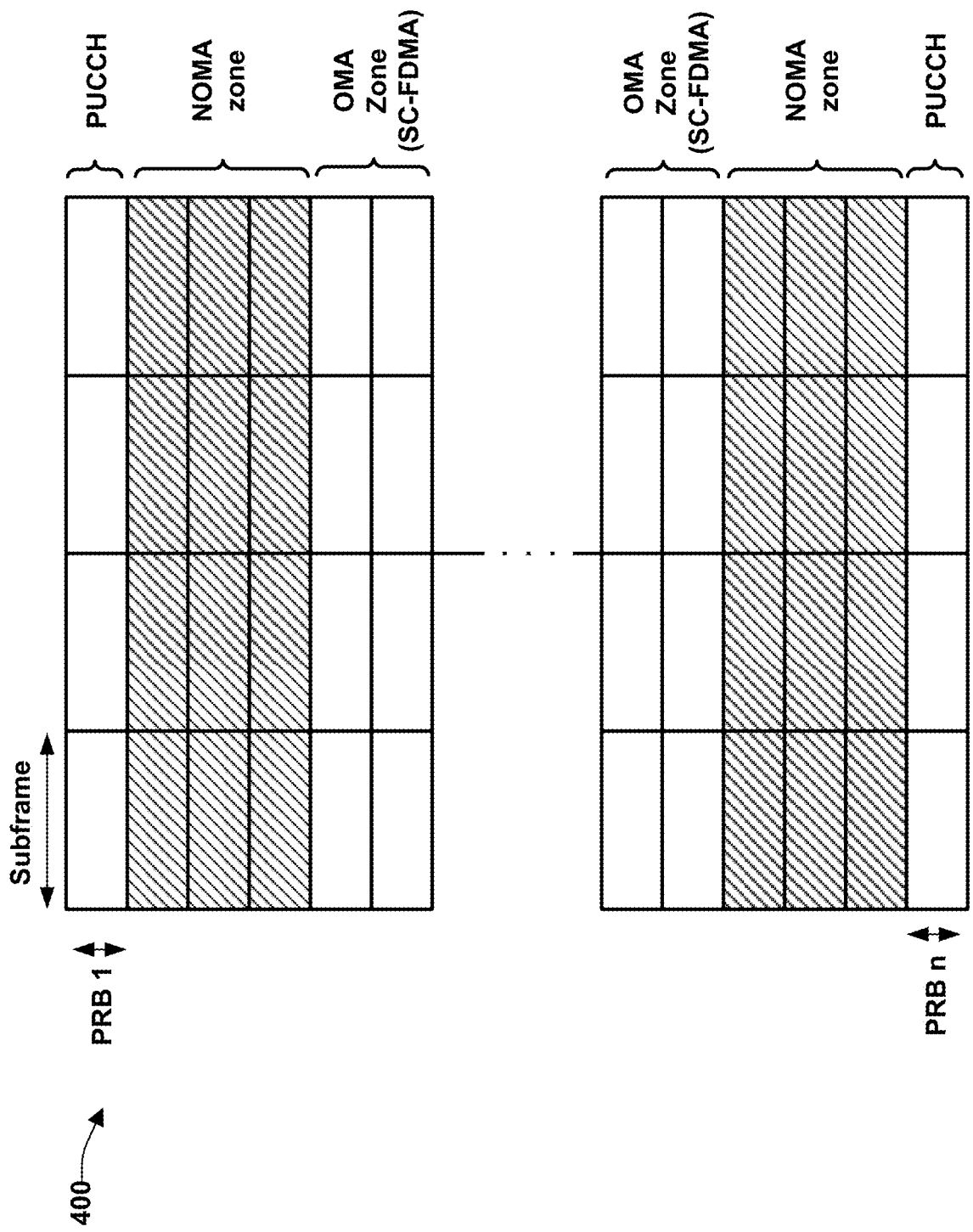
FIG. 4 illustrates an example transmission with designated resources of a NOMA or OMA zone that can be assigned or designated to one or more UEs according to various aspects or embodiments.

Referring to briefly to FIG. 4, illustrated is an example of NOMA and OMA allocation zones of PRBs assigned on either end of a physical channel bandwidth for multiple access in a network channel in accordance with various aspects. PRBs of each zone can be enabled for communication based on a designation or an assignment of the zones to UEs (e.g., 110, 116) by the eNB 102. For example, the eNB 102 can assign a NOMA zone or an OMA zone for multiplexing UEs in uplink communications based on one or more criteria, such as a threshold (e.g., an IoT threshold), a transmission rate, a packet size, or the like. TDMA and OFDMA are examples of multiple access schemes that can be utilized. The UEs (e.g., 110, 116) can communicate and modify their communication resources (e.g., PRBs, symbols, resources in time or frequency, or the like) within the NOMA zone without any explicit grant from the eNB 102 before modification.

The UEs 110, 116 can further modify use of the NOMA zone to the OMA zone by providing a request message or an indication of the transmission rate or packet size of communications currently being used or stored in a buffer queue to the eNB 102. Alternatively or additionally, the eNB 102 can detect the change and self-initiate the change of zone to OMA or NOMA PRBs when the transmission rate or transmission size of the UE has satisfied (e.g., exceeded) the threshold or IoT threshold. As such, the UE 110, 116 can utilize OMA zone resources or PBRs from NOMA zone resources based on an indication or grant from the eNB 102 in a multiple access scheme.

TDMA and OFDMA are examples of multiple access communication schemes. TDMA defines different time slots, slot 1, 2, 3, etc., where OFDMA comprises subcarriers that form a physical resource block (PRB) and the PRB can assign PRB 1 to UE 1 (e.g., UE 116), assign PRB 2, 3, 4 to UE 2 (e.g., 110) and PRB 5-7 to UE 3 (e.g., 112), etc., for example. TDMA, OFDMA, FDMA or single carrier frequency division multiple access (SC-FDMA) can be called multiple access schemes for scheduling uplink transmissions. These schemes can also be considered OMA schemes because orthogonal time frequency resources can be exclusively assigned to different UEs so their transmission do not interfere as much with one another, or even cancel one another. In contrast, NOMA includes non-orthogonal access schemes, in which the resources (e.g., reference symbols, resource elements, PRBs, or the like) assigned to multiple users or UEs are not orthogonal to one another. Rather than assigning PRB 1 to UE 1 and assigning PRB 2 to UE 2, instead resources/resource elements can be assigned so that PRB 1 can be assigned to both UE 1 and UE 2 for generating transmissions, and PRB 2 can be assigned to UE 2, UE 3, UE 4 etc., such that these resources can be overlapped or shared among different UEs. This is an advantage to multiple access schemes and on a very high level these schemes can be classified as NOMA or OMA.

In terms of system capacity, if an eNB 102 has 10 PRBs to utilize as limited resources, it can utilize those resources to maximize the system capacity with the best displacement via NOMA resources of the NOMA zone. NOMA schemes can be similar to CDMA schemes in the sense that in the uplink transmissions of CDMA systems there is no utilization of orthogonal time frequency resources. In NOMA schemes utilizing one or more PRBs of the NOMA zone, there is no time overlap concept, instead it utilizes a multiple user transmission that is a superimposed operation with the assigned resources.

The eNB 102 can attempt detect the multiple user transmissions. However, pros and cons exists between OMA and NOMA schemes. NOMA provides a higher guaranteed capacity, while OMA provides the bandwidth from different angles to a simple receiver because there is no inter-user interference among UEs (e.g., UE 110 and 116), and thus, receiver design can be simpler. For high data rate transmission, larger packet transmissions, or multi user detection, which means the receiver decodes or detects multiple simultaneous transmissions from different individuals, the receiver can become more complicated as the data rate of each user becomes larger, and as such the packet size of each user thus becomes larger.

Network devices (e.g., eNBs, UEs or the like) can enable utilizing NOMA zones and OMA zones in multiple access schemes for scheduling uplink transmissions in a synchronous network 140 based on certain applications such as the machine type communication (MTC), massive MTC (mMTC), or IoT standard/protocol. In these applications, there can be targets for massive connection with a large number of UEs connected to the network 124. For example, a bridge 3GPP to 5G network connection can have a target density in terms of the number of UEs in a one square kilometer can be about one million UEs. The UEs can be machines, components, wireless or mobile devices with a processing unit or microprocessor, or any mechanical/processing entity/component communicatively coupled to a network or eNB (e.g., 102) as a user equipment for communication with a transceiver or communication component to receive and transmit among other components or network devices. In such a network environment, very small packets and very infrequent transmission can exist, but there can be a large number of UEs or machines utilizing an IoT or MTC communication protocol with smaller transmission rates or transmission packet sizes below a predefined threshold, for example, such as below a 3G, LTE, 4G or beyond protocol for cellular communication.

One of the design goals is to support additional UEs on the network (e.g., network 124), assuming the similar/common traffic model with one packet alive per month of each user as a potential predefined threshold, or with packet size of about 200 bits, which is relatively small in wireless communication contexts. The goal thus can be to support more UEs with a given time frequency (e.g., 1 MHz, or 10 MHz) with more users. Under such goals, NOMA can be more efficient or provide higher capacity, such as for the number of supported UEs in an area. For example, OMA schemes could enable one million UEs to be serviced by an eNB 102 within a coverage zone or area 124, 140, or 142, where NOMA could provide for 1.5 million UEs, for example.

In an aspect, the threshold for switching or signalling an OMA zone to a NOMA zone for a UE 116 to utilize for transmission, for example, can be a packet size of about 1,000 bits. As long as, the packet size for transmission, for example, is below a certain predefined rate or packet size, there is no explicit signalling and NOMA zone resources can be configured or utilized for uplink transmission by the assigned UEs 110, 116, and any PRB can be modified within that NOMA zone without further explicit grant messages from the eNB 102.

In an aspect, UE (e.g., 116) can transmit the data without explicit grant messages as long as its packet size, transmission rate, or both is smaller than one or certain thresholds, such as an IoT standard threshold. A set of PRBs can be assigned as NOMA zone for a range of resources or PRBs corresponding to one or more rates, packets, frequencies or time ranges, where the UE 116 or other UEs assigned the NOMA zone of a physical channel can alter or modify its transmissions among any of the PRBs within the NOMA zone without a grant (e.g., UL grant). This configuration of what PRBs are designed or available to the UE 116 as a NOMA or OMA zone can be indicated via an initial explicit signalling via one or more system information blocks (SIBs). The UE 116 can further request OMA resources by sending a Buffer Status Report (BSRs) in LTE for transmission with larger packets.

In an aspect, the NOMA zone of the transmission subframes 400 of FIG. 4 can have non-contiguous PRBs distributed over the transmission bandwidth for frequency diversity. For example, if the NOMA allocation zone comprises 6 PRBs, 3 PRBs each can be assigned on either end of the PUSCH bandwidth. The eNB 102 can enable the NOMA zone of the bandwidth for NOMA schemes associated with small packets, or infrequent transmission according to a threshold. This can reduce signaling over the network because, in contrast to OMA, OMA schemes for LTE incorporate signaling overhead to assign resources, where eNB 102 explicitly indicates, for example, that PRB 1 is UE 1, and PRB 2 is UE 10, and so on. In OMA there can be an explicit signal for resource allocation, but in NOMA schemes simultaneous transmission is allowed on the same resources and it does not require any assignment signalling. A such, where packet sizes, or transmission rates at UEs are smaller, those UEs can be assigned the NOMA zone across the channel bandwidth, while other UEs are assigned resources within the OMA zone and utilize OMA schemes specifically for transmission.

As packet size to the scheduled handler or network device can become smaller, depending upon the communication with another network device or UE, the relative signalling overhead can become larger. NOMA can provide a higher system capacity, and a higher gain over OMA schemes. The transmission can vary, for example, depending on a rate or a size of an uplink transmission in a buffer or queue. For example, when a UE uploads a file, then typically the packet size from the upper layer perspective (e.g., above a PHY layer) can be large (e.g., several Gigabytes for FTP, one or more Megabytes, or higher). From the physical layer perspective, because there can be a large packet in the RRC layer, MAC layer, or PHY layer segment, and from the PHY layer perspective in LTE, the packet size can be about 6,000 bits per segment. This size can vary, and in IoT applications or MTC application the standard packet size can be very small, such as one hundred or hundreds of bits, depending on the application. In addition, a meter or IOT component could communicate an update to an eNB 102 or WiFi IP component once a month or every few days to provide an indication of the transmission rate or packet sizes being communicated over a network (e.g., an LTE, wireless, NextGen, or IoT network). For example, this rate or size can be communicated as part of the BSR from the UE 110, 116 to the eNB 102, or by other mechanisms. Because packet sizes for IoT or other applications can be small and infrequent, the eNB 102 can more efficiently deal with such application packets by granting NOMA zone resources to the UE 116 on a synchronous network 140, for example.

The NOMA zone of the channel bandwidth (e.g., PUCCH) can be overlapped by different UEs. These UEs can move within those resources of the NOMA zone without any explicit further grant or modification of a grant. In one example, depending on the buffer status of the UE 116, the UE 116 could be assigned to utilize an OMA zone by grant, or at other times transmit its data in NOMA zone without any grant, depending on a decisions by the eNB 102 based on one or more criteria such as an IoT threshold, rate, packet size, or other parameter.

If the eNB 102, for example, receives the UL transmission or request for a zone modification successfully via a transmission through the OMA zone, the UE 1116, or 110 could then signal to the eNB 102 that it has 1,000 bits as part of a request to give resources in the OMA zone, rather than the NOMA zone. Additionally or alternatively, a request could be received by the eNB 102 from a UE 110, or 116 to utilize a NOMA zone rather than an OMA zone. As such, once the associated resources are assigned for the NOMA zone (e.g., PRBs 2-4, or otherwise), then unless the NOMA zone designated resources changes, no further or additional signaling (e.g., by UL grant or transmission scheduling grant) is needed by the UE 110, 116 to modify resources or PRBs within the NOMA zone.

Further, the eNB 102, depending on a scheduling decision can at some point assign a PRB (e.g., PRB 4) in the PUCCH channel to transmit the data, and depending on the buffer status of the UE 110 or 116, assign or re-assign use of a PRB (e.g., PRB 3) of the NOMA zone. Once assigned to a PRB of the NOMA zone, the UE 110, 116 can then modify its communication transmission to use any PRB of the NOMA zone without any further explicit grant, for example, and by performing an LBT protocol on the resource within the NOMA zone. As such, a bi-signalling can be generated from the eNB 102 for a certain set of resources defined or configured as a NOMA zone so that the UE that is allowed to transmit through NOMA zone can transmit data though the NOMA, and another UE not allowed to transmit via NOMA zone would transmit through OMA zone. Thus, the eNB 102 can operate with some scheduling discretion over the network 124 for various UEs or UE groups identified or assigned with UE group IDs, for example.

In an aspect, for uplink NOMA in synchronous systems or within the synchronous network 140, the eNB 102 can assign NOMA zone resources to one or more UEs 116, and OMA zone resources to one or more UE 110 on any asynchronous connection 142, for example. Some resources can be reserved for uplink, in which the uplink users (UEs) might/might not share and can also operate based on a contention based protocol. The eNB 102 can statically or semi-statistically configure OMA and NOMA regions (or zones) in a TDM, FDM, or TDM/FDM manner. The NOMA zone can be transparent to the UEs 116 in the cell 140 assigned thereto. Once a UE 116 is assigned a NOMA region(s) and rate(s), the UE 116 can send data at or below the assigned NOMA rate via the NOMA region without any additional explicit grant from the eNB 102. These procedures can reduce latency and control overhead. When the UE 116 desires to transmit data at a high rate (or large packet size) greater than a threshold than the assigned NOMA rate, it can request an explicit grant for OMA transmission (e.g., explicit PRBs, MCSs, etc.) as similar in LTE operations.

Figure 2:
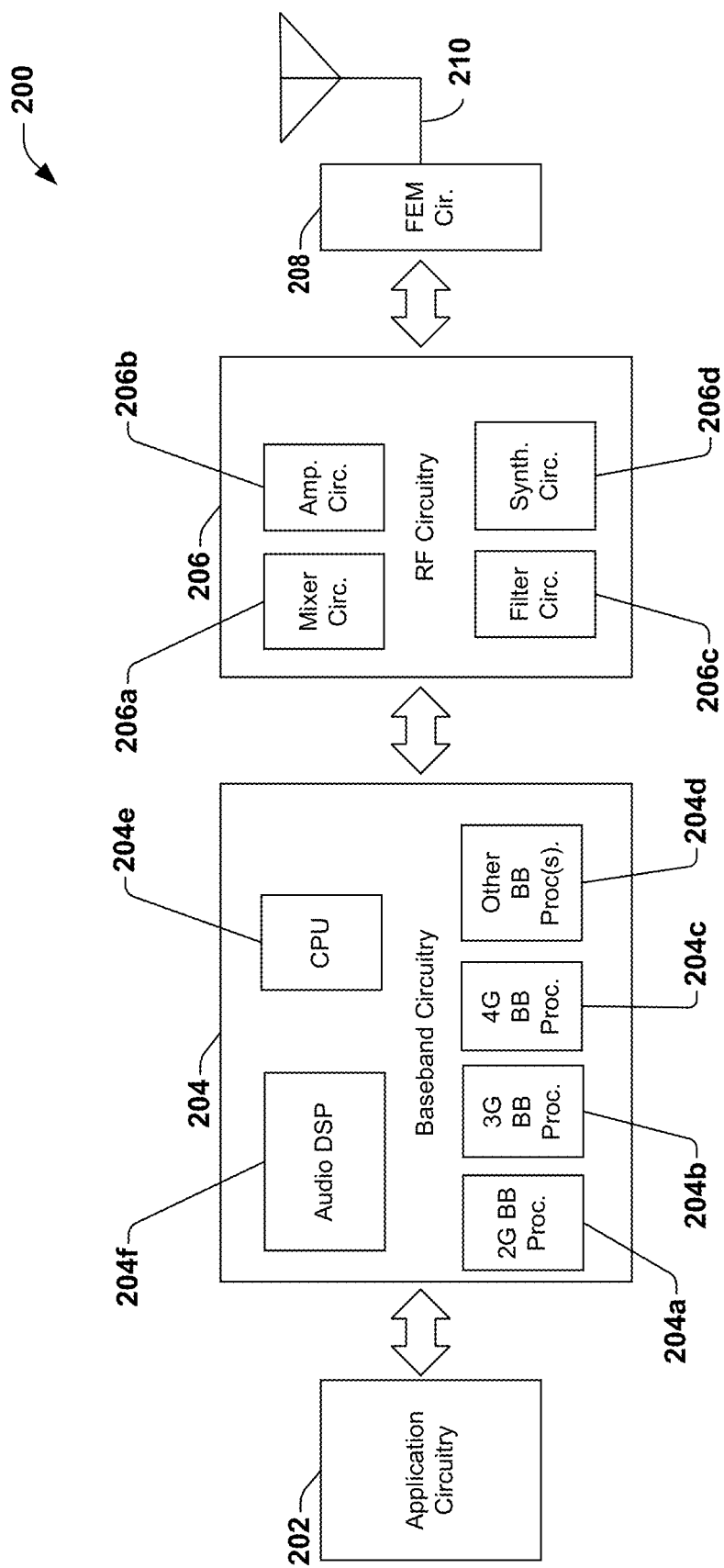
FIG. 2 illustrates example system or device for scheduling transmission for spreading options in a NOMA or OMA zone according to various aspects or embodiments.

Embodiments described herein and further detailed in this disclosure can be implemented into an example system using any suitably configured hardware/software. FIG. 2 illustrates, for one or more embodiments, example components of a cell network device 200, such as a base station, a macro cell network device, a secondary cell network device, a small cell network device, an evolved/enhanced NodeB (eNB), or any other network device (e.g. a user equipment, pico cell, Femto cell or the like) that can be used on a wireless network to generate or process signaling for scheduling transmissions. In some embodiments, the cell network device 200 can include application circuitry 202, baseband circuitry 204, Radio Frequency (RF) circuitry 206, front-end module (FEM) circuitry 208 and one or more antennas 210, coupled together at least as shown.

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 204 can include circuitry such as, but not limited to, one or more single-core or multi-core processors. The baseband circuitry 204 can include one or more baseband processors and/or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a second generation (2G) baseband processor 204*a*, third generation (3G) baseband processor 204*b*, fourth generation (4G) baseband processor 204*c*, and/or other baseband processor(s) 204*d* for other existing generations, generations in development or to be developed in the future (e.g., fifth generation (5G), 6G, etc.). The baseband circuitry 204 (e.g., one or more of baseband processors 204*a*-*d*) can handle various radio control functions that enable communication with one or more radio networks via the RF circuitry 206. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, and/or constellation mapping/demapping functionality. In some embodiments, encoding/decoding circuitry of the baseband circuitry 204 can include convolution, tail-biting convolution, turbo, Viterbi, and/or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204*e* of the baseband circuitry 204 can be configured to run elements of the protocol stack for signaling of the PHY, MAC, RLC, PDCP and/or RRC layers. In some embodiments, the baseband circuitry can include one or more audio digital signal processor(s) (DSP) 204*f*. The audio DSP(s) 204*f* can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with a EUTRAN and/or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the RF circuitry 206 can include a receive signal path and a transmit signal path. The receive signal path of the RF circuitry 206 can include mixer circuitry 206a, amplifier circuitry 206b and filter circuitry 206c. The transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c. The filter circuitry 206c can include a low-pass filter (LPF), although the scope of the embodiments is not limited in this respect.

In some embodiments, the mixer circuitry 206a of the receive signal path and the mixer circuitry 206a of the transmit signal path can include two or more mixers and can be arranged for quadrature down-conversion or up-conversion respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct down-conversion or direct up-conversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+2 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+2 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+2 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210.

In some embodiments, the FEM circuitry 208 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210.

In some embodiments, the cell network device 200 can include additional elements such as, for example, memory/storage, display, camera, sensor, and/or input/output (I/O) interface. In some embodiments, the electronic device of FIG. 2 can be configured to perform one or more processes, techniques, and/or methods as described herein, or portions thereof.

Figure 5:
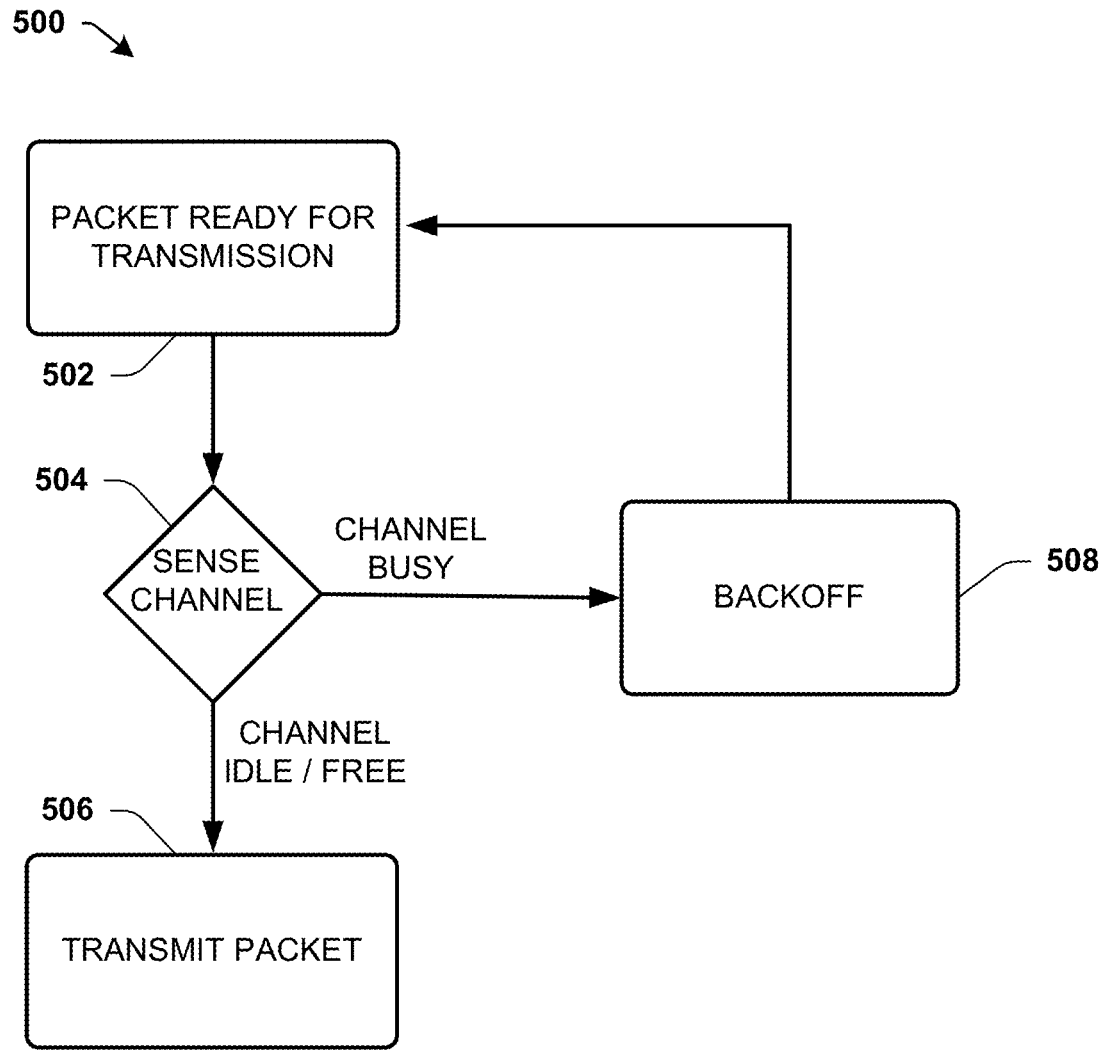
FIG. 5 illustrates an example network protocol for self admission control in sharing resources of a NOMA zone or an OMA zone according to various aspects or embodiments.

Referring briefly to FIG. 5, illustrated is an example process flow 500 for self-admission control in accordance with various aspects or embodiments. The network device 200 can operate to generate/process NOMA zone and OMA zone assignments within a physical channel for multiple access or multiplexing UEs, as discussed herein. The one or more UEs 116 or 110, for example, can operate with self-admission control via LBT operations when transmission packets are ready in a buffer/queue, or have been generated at 502.

With self-admission control processes 500, the UEs (e.g., 116 or 110) or the eNB 102, as the network device 200, can measure the energy in the NOMA zone at 504, in which the channel or NOMA zone is sensed or measured based on a signal strength, a channel quality, a signal-to-noise-plus interference ratio (SINR), a received signal strength indictor (RSSI) or other measurement such as a reference signal received power (RSRP), a reference signal received quality (RSRQ), or the like. At the sensing or decision 504, the UE 110 or 116 transmits if the measured energy is below a certain pre-defined threshold within the NOMA zone, while initially processing/generating transmission via an assigned PRB within the zone or not. Once assigned to the NOMA zone overall or a particular resource therein, the one or more UEs 116 or 110 can modify resources within the zone without signalling or any grant by the eNB 102 by utilizing self-admission control, including an LBT operation or procedure to the resource in the NOMA zone prior to transmission.

The LBT can include a backoff operation at 508 where the NOMA zone is detected as having a measured level (power level, energy level, noise ratio or the like) as satisfying an LBT threshold and likely busy. After the backoff period, the LBT can generated at the resource(s) of the NOMA zone again, until an idle state is detected by the measured level being below the LBT threshold, for example, and the UE can transmit the packet at 506.

Referring back to FIG. 2, the UE 110 or 116, for example, can further generate with one or more components of the application circuitry 202, baseband circuitry 204, or RF circuitry 206 a contention based PUSCH. A set of UEs can be assigned a certain set of resources in the PUSCH, for example, and generate contention based protocols by which to share these resources or PRBs in the NOMA zone. Contention based protocols (CBPs) can be utilized among UEs 116, for example, assigned to the NOMA zone regions without having to be mediated by the eNB 102. CBPs can operate for network devices to use the same PRB, resource or symbols within the NOMA zone with a set of rules as part of a pre-coordination, such as a listen before talk or other contention-based protocols that allow multiple UEs to share the same symbol or PRB along the channel band. The contention based PUSCH can include a set of rules for transmission sharing of a PRB or other resource within the NOMA zone assigned to multiple UEs 116 so that events such as transmission or access to the channel can be shared. Events such as new transmission, determining the state of the PUSCH or other physical channel (available or unavailable), or managing retransmissions in the event of a busy channel can be related to the set of rules for the contention based PUSCH between UEs, for example, or, in other words, the rules can be related to these or other signalling events for transmission such as buffer status or the like. Remaining signaling operations can then be similar to LTE standard protocols. It is assumed here that since small packet transmissions are intermittent and infrequent, and thus the collision probability is likely small for resources within the NOMA zone and below a predefined threshold (e.g., an IoT threshold or the like).

In another embodiment, the UEs 110, 116 can generate direct spreading with potentially multiple codes. Different UEs can use orthogonal codes (for e.g., Zadoff-Chu sequences) to transmit on the same set of resources. Here data can be spread onto 1 PRB, 2 PRBs, etc. In one example, multiple UEs 116, 110 can be divided into a number of groups according to group identifiers (IDs), and UEs within the same group/same group ID can be assigned orthogonal codes with respect to one another for utilizing resources within the NOMA zone of the channel. These different UE groups connected to the network (e.g., synchronous network 140) can share the same set of resources and scrambling based on the group ID. This can be advantageously utilized to lessen the effects of interference from multi-UE access.

In another embodiment, PRBs of the NOMA zone can be spread over the whole bandwidth of the channel, either by repetition or rate matching. The network device 200 can thus operate to multiplex UEs 116 as an eNB 102, or be a part of such multiplexed signalling as UEs 116 in LTE uplink communications by rate matching or repetition signaling operations of their symbols. A combination of both rate matching or repetition can be used to communicate PRBs across the NOMA zone and across the entire channel bandwidth. The degree of the combination of rate matching with repetition can be dependent on the number of UEs simultaneously transmitting on the network. These operations can be used to boost the efficiency (e.g., antenna efficiency) of transmitting UEs, for example.

Figure 3:
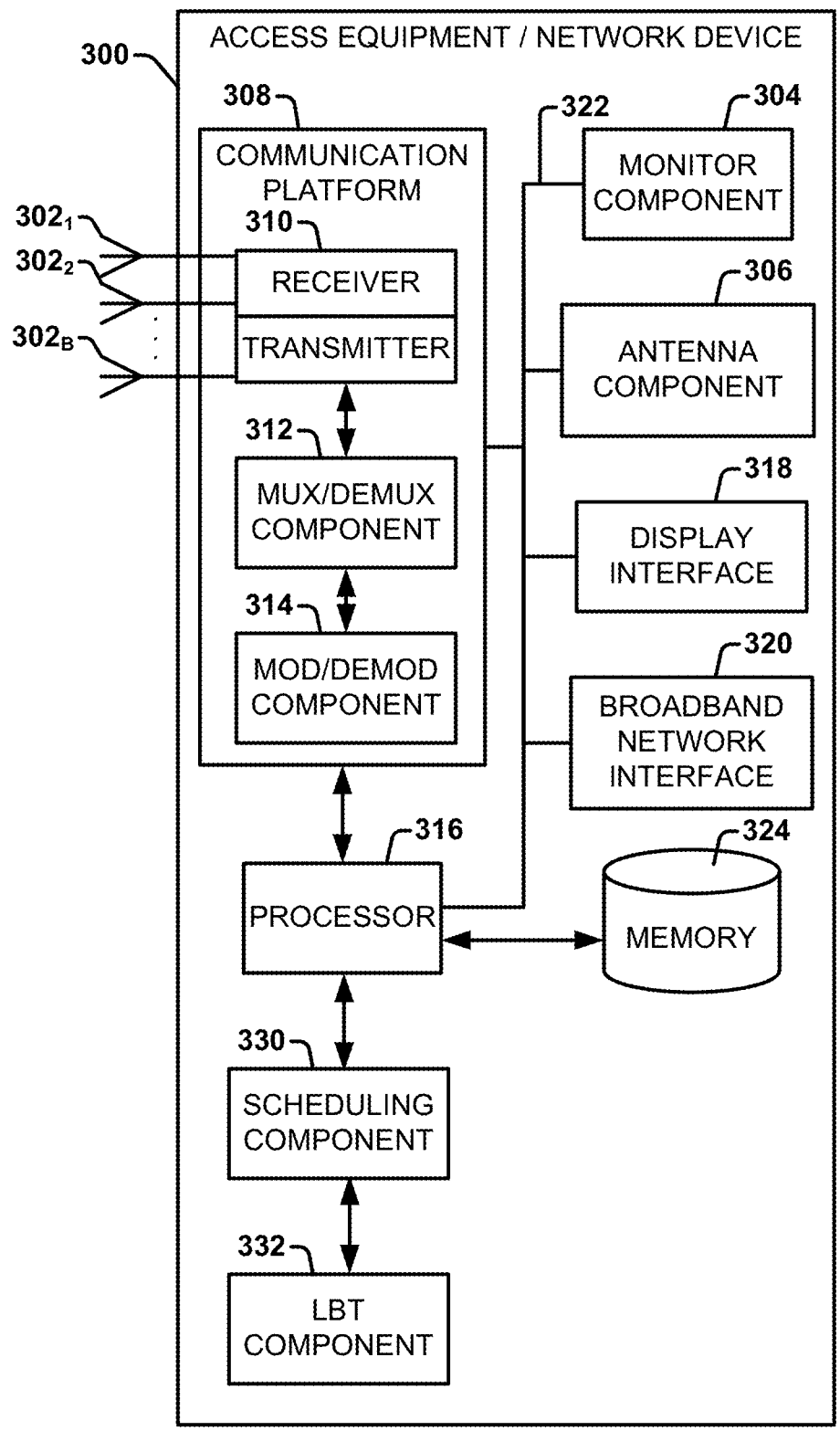
FIG. 3 illustrates an example network device for scheduling transmission for spreading options in a NOMA or OMA zone according to various aspects or embodiments.

FIG. 3 further illustrates an embodiment of a network device or system 300 to be employed in an eNB (e.g., 102), a UE (e.g., 110, 116) or other network device that facilitates or enables signaling mechanisms to process or generate transmissions in a channel band within a NOMA zone corresponding to particular PRBs. System or device 300 can include the baseband circuitry component 204, the radio frequency (RF) circuitry component 206, or a front end module circuitry component 308 of FIG. 2, as well as communication component or platform 308 with transmitter circuitry component(s)/receiver circuitry component 310 (e.g., a communication component), a processor 316, memory 324, a scheduling component 330 and an LBT component 332.

In various aspects, device 300 can be included within an Evolved Universal Terrestrial Radio Access Network (E-UTRAN) Node B (Evolved Node B, eNodeB, or eNB 102), other base station, network access point, a secondary cell network device (e.g., a small cell, or WiFi network device) or other cell network component/device (e.g., UE 116 and 110) in a wireless communications network (e.g., network 124). Memory 324 also can include instructions that can be implemented by processor 316, transmitter circuitry 310, or receiver circuitry 310 to implement various aspects or embodiments described herein.

Memory 324 can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Access equipment (e.g., eNB, network entity, or the like), UE or software related to access of the network device 300 can receive and transmit signal(s) from and to wireless devices, wireless ports, wireless routers, etc. through segments $302_1$-$302_B$ (B is a positive integer). Segments $302_1$-$302_B$ can be internal and/or external to access equipment and/or software related to access of a network, and can be controlled by a monitor component 304 and an antenna component 306. Monitor component 304 and antenna component 306 can couple to communication component 308, which can include electronic components and associated circuitry that provide for processing and manipulation of received signal(s) and other signal(s) to be transmitted.

In an aspect, communication component 308 includes the receiver/transmitter 310 that can convert analog signals to digital signals upon reception of the analog signals, and can convert digital signals to analog signals upon transmission. In addition, receiver/transmitter 310 can divide a single data stream into multiple, parallel data streams, or perform the reciprocal operation. Coupled to receiver/transmitter 310 can be a multiplexer/demultiplexer 312 that can facilitate manipulation of signals in time and frequency space. Multiplexer/demultiplexer 312 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 312 can scramble and spread information (e.g., codes, according to substantially any code known in the art, such as Hadamard-Walsh codes, Baker codes, Kasami codes, polyphase codes, and so forth).

A modulator/demodulator 314 can also be a part of communication component/platform 308, and can modulate information according to multiple modulation techniques, such as frequency modulation, amplitude modulation (e.g., M-ary quadrature amplitude modulation, with M a positive integer); phase-shift keying; and so forth).

Access equipment or software related to access of a network also includes a processor 316 (or processor component) configured to confer, at least in part, functionality to substantially any electronic component in access equipment/software. In particular, processor 316 can facilitate configuration of access equipment and/or software through, for example, monitor component 304, antenna component 306, and one or more components therein. Additionally, access equipment and/or software can include display interface 318, which can display functions that control functionality of access equipment and/or software or reveal operation conditions thereof. In addition, display interface 318 can include a screen to convey information to an end user. In an aspect, display interface 318 can be a liquid crystal display, a plasma panel, a monolithic thin-film based electrochromic display, and so on. Moreover, display interface 318 can include a component (e.g., speaker) that facilitates communication of aural indicia, which can also be employed in connection with messages that convey operational instructions to an end user. Display interface 318 can also facilitate data entry (e.g., through a linked keypad or through touch gestures), which can cause access equipment and/or software to receive external commands (e.g., restart operation).

Broadband network interface 320 facilitates connection of access equipment or software to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 320 can be internal or external to access equipment and/or software and can utilize display interface 318 for end-user interaction and status information delivery.

Processor 316 can be functionally connected to communication platform 308 and can facilitate operations on data (e.g., symbols, bits, or chips) for multiplexing/demultiplexing, such as enabling direct and inverse fast Fourier transforms, selection of modulation rates, selection of data packet formats, inter-packet times, and so on. Moreover, processor 316 can be functionally connected, through data, system, or an address bus 322, to display interface 318 and broadband network interface 320, to confer, at least in part, functionality to each of such components.

In access equipment and/or software memory 324 can retain location and/or coverage area (e.g., macro sector, identifier(s)) access list(s) that authorize access to wireless coverage through access equipment and/or software sector intelligence that can include ranking of coverage areas in the wireless environment of access equipment and/or software, radio link quality and strength associated therewith, or the like. Memory 324 also can store data structures, code instructions and program modules, system or device information, code sequences for scrambling, spreading and pilot transmission, access point configuration, and so on. Processor 316 can be coupled (e.g., through a memory bus), to memory 324 in order to store and retrieve information used to operate and/or confer functionality to the components, platform, and interface that reside within access equipment and/or software.

The network device 300, system, component or device herein can be incorporated into or otherwise part of, an eNB, a UE, or some other type of electronic device in accordance with various embodiments. Specifically, the electronic device or components or interfaces described herein can be logic and/or circuitry that can be at least partially implemented in one or more of hardware, software, or firmware. In some embodiments, the electronic device logic can include radio transmit logic and receive logic (e.g., 310) coupled to control logic (e.g., processor 316). Additionally or alternatively, transmit/receive logic can comprise elements or modules of transceiver logic 310. The electronic device, component(s), circuitry or interfaces of such electronic device can be configured to perform operations similar to those described elsewhere in this disclosure.

In one embodiment, the processor 316, the communication platform/component 308, or the scheduling component 330 can generate or process a set of PRBs for a NOMA zone and an OMA zone. Further, these PRBs can be assigned to the NOMA zone for particular UEs 116 on the network, while other UEs 110 can be assigned or re-assigned to PRBs of an OMA zone. The assignment, for example, can be based on a predefined threshold of a transmission rate, a packet size or other parameter for transmission such as a buffer status or packet transmission queue status. The configuration of the NOMA zone and corresponding resources, along with their assignment to particular UEs can be facilitated by an initial explicit signaling by one or more SIBs. The UEs can request OMA resources by sending Buffer Status Report (BSRs) like in LTE, for larger packets. This NOMA zone can have non-contiguous PRBs distributed over the transmission bandwidth, as illustrated and described in relation to FIG. 4.

In one embodiment, the scheduling component 330 can multiplex UEs for uplink in an LTE network or NextGen 5G based network or beyond, where multiple UEs are assigned certain resources of PUSCH and the UEs contend to transmit. The scheduling component 330 can operate to divide UEs into groups and assign group IDs to each group. UEs within the same group can be assigned orthogonal codes by the scheduling component 330 and can thus operate orthogonal to each other within the group.

Within each UE 110 or 116 a scheduling component 330 can enable the groups of UEs share the same set of resources and scrambling based on group ID can be used to lessen the effect of interference. The UEs 110 or 116 could operate via the scheduling component 330 to spread their corresponding symbols over the whole NOMA zone, either by rate matching or repetition of their symbols or a combination of both. Additionally or alternatively, the NOMA zone or PRB allocation for UEs can be hopped (e.g., frequency hopped or the like) to provide further frequency diversity gain. The interference from other UEs can be treated as noise during coding or decoding operations, successively cancel interference, or perform a maximum likelihood (ML) decoding operations as well.

In another embodiment, the listen before talk (or LBT) component 332 can operate to enable self-admission control via LBT operations when transmission packets are ready in a buffer/queue, or have been generated. The UEs (e.g., 116 or 110) or the eNB 102, for example, can measure the energy in the NOMA zone via the LBT component 332, as part of receiver or transmission communication circuitry discussed herein, in which the channel or NOMA zone is first measured by an LBT protocol. The UE 110 or 116 transmits if the measured energy is below a certain pre-defined threshold within the NOMA zone, while initially processing/generating transmission via an assigned PRB within the zone or not. Once assigned to the NOMA zone overall or a particular resource therein, the one or more UEs 116 or 110 can modify resources within the zone without signalling or any grant by the eNB 102 by utilizing self-admission control, including an LBT operation or procedure to the resource in the NOMA zone prior to transmission.

Figure 6:
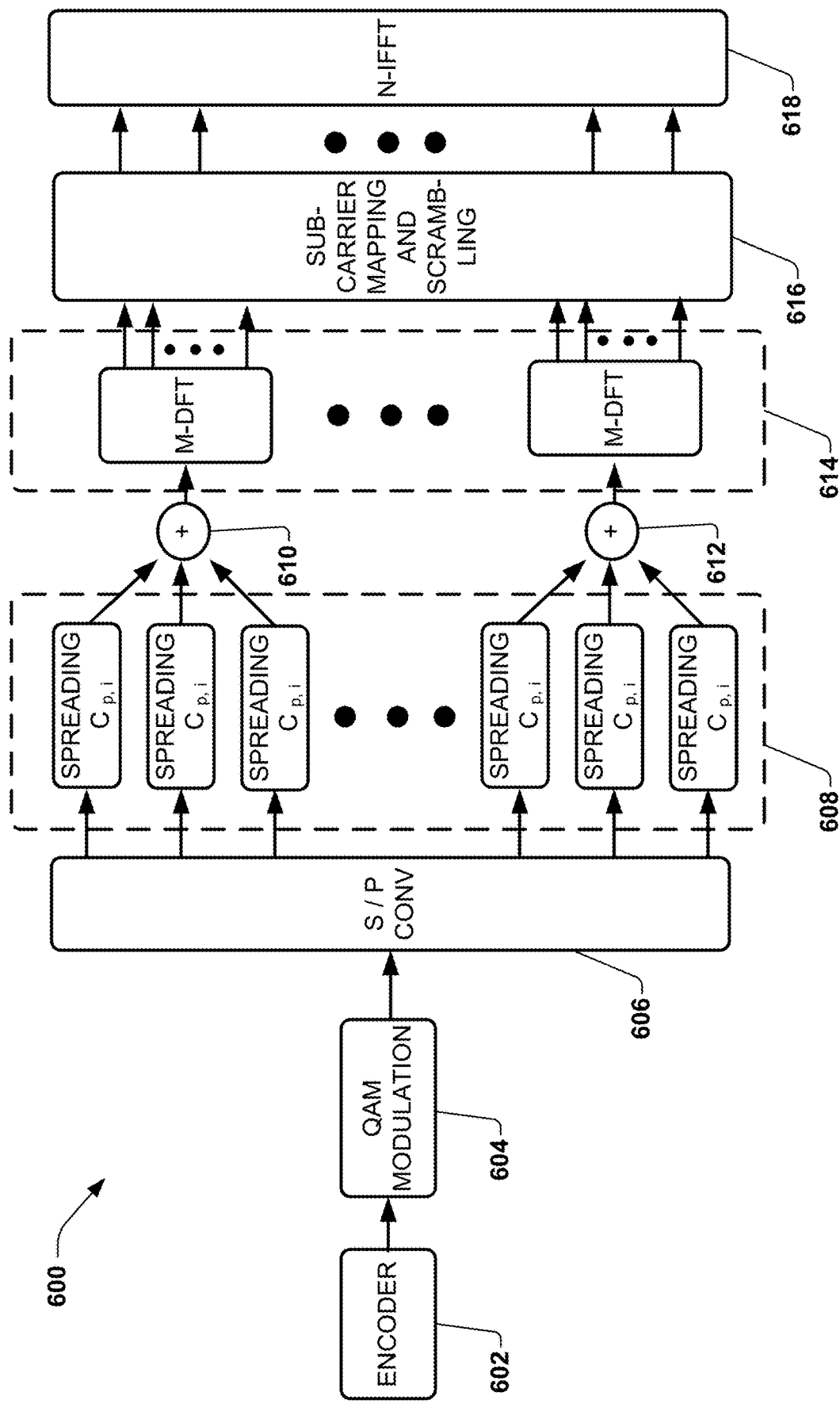
FIG. 6 illustrates an example processing pipeline for a network device for spreading options in a NOMA or OMA zone according to various aspects or embodiments.

Referring to FIG. 6, illustrated is an example system as part of or coupled to components discussed herein for assigning a set of PRBs as a NOMA zone, where particular UEs can transmit the data without explicit grant messages as long as their packet size or transmission rate is smaller than predefined thresholds. This configuration can be indicated via explicit signaling, such as through one or more SIBs.

The system 600 can include an encoder 602 connected to a quadrature amplitude modulation (QAM) component 604 connected to a serial to parallel (S/P) conversion component 606, which is further connected to a plurality of spreading components 608. The plurality of spreading components 608 can be connected to adders 610 and 612, respectively, which can be associated with different partitions of groups of UEs with different UEs 110, 116 according to a group ID. The adders 610, 612 provide outputs to the mapped M points discrete fourier transform (M-DFT) components 614, which are further connected to a subcarrier mapping and scrambling component 616 and an N points mapped inverse fast fourier transform (N-IFFT) component 618.

In one embodiment, UE i (e.g., UEs 110, 116) can use orthogonal codes (e.g., Zadoff-Chu sequences) to transmit on the same set of resources, in which i can be an index of a network connected UE 110, 116. The incoming symbols from the QAM modulator component 604 (or QAM modulator) can be spread using p orthogonal codes. Then the spread symbols at each spreading component 608 can be added to each other at adders 610 and 612 before DFT spreading at M-DFT components 614, subcarrier mapping at mapping/scrambling component 616 and IFFT operation at N-IFFT component (module) 618. The length of the spreading codes Cp,i can be equal to M, which is the size of the M-DFT components 608 also.

The M-DFT components 614 can perform a DFT spreading operation on the combined QAM symbols to obtain DFT-spread symbols.

The subcarrier mapping component 616 (e.g., a mapping module) can map the DFT-spread symbols to PRBs of the NOMA zone across a channel bandwidth. The subcarrier mapping component 616 can thus map the DFT-spread symbols to resources designated as belonging to the NOMA zone. In addition, the users in a cell can be divided into multiple groups, with users within the same group using orthogonal resources in the NOMA zone with respect to one another.

The IFFT component 618 can perform one or more IFFT spreading operations on the mapped DFT-symbols.

For a given NOMA zone, multiple configurations can be possible. For example, the DFT block size M can be equal to 12, 24, 36, etc., with the maximum being equal to the NOMA allocation zone. Thus, for NOMA allocation zone of 6 PRBs, the maximum value of M can be 72, and the spreading factor as a number of repetitions for antenna boosting can also be M.

In an aspect, Zadoff-Chu (ZC) sequences can be used for generation of the orthogonal codes within a UE group or set of UEs, such as by the following expression:

$$a_{q(n)} = \exp\left[-\frac{j2\pi qn(n+1)/2}{N_{ZC}}\right],$$

$$q = 1, \ldots, N_{ZC} - 1 \text{ and } n = 0, \ldots, N_{ZC} - 1$$

Here, q can represent the root and $N_{ZC}$ the length of the ZC sequence. These sequences exhibit near perfect autocorrelation properties, thus the correlation of any such sequence with its cyclic shift can be zero. The length of the ZC sequence $N_{ZC}=M$. Each codeword Cj,i can be obtained as a cyclic shift of the base sequence. Thus, for a codeword of size M, maximum M orthogonal codewords can be generated. If a UE uses p codewords, then assuming similar payload size, M/p orthogonal UEs can be supported.

UEs 110, 116 can be multiplexed according to groups or one or more UEs assigned to a NOMA zone or an OMA zone for utilizing channel resources. A given group or plurality of UEs can be divided into a number of groups assigned to different resources or PRBs of the NOMA zone, in which the UEs within the same group being assigned orthogonal codes with respect to one another in the same group. Different groups can share the same set of resources and scrambling based on group ID can be used to lessen the effect of interference. UEs can spread codes using orthogonal sequences such as by using a Zadoff-Chu sequence, as described in the equation above for a sequence used in the network. Multiple users/UEs can utilize different Zadoff-Chu sequences for the purpose of spreading operations across or among a NOMA zone of the channel band.

With NOMA schemes, if multiple UEs simultaneously transmit with the same resource(s) and the received signal at the eNB 102 is nearly identical, then a metric such as an SINR could be smaller than or less than zero dB because the interference can be as strong as the desired signal. The SINR is thus very low. As in TDMA schemes, a mechanism to boost or improve antenna performance can be enabled. Among other methods, repetition can increase the SINR. If repeated two times, for example, then the antenna can be 3 dB higher the a one-time transmission, if repeated ten times then it can be 10 dB higher antenna.

Spreading can be understood as a repetition. In an aspect, the antenna of a network device 200 can be boosted by a direct spreading with multiple codes, which are different or unique from one another. Repetition can mean that if a repetition of codes or a codeword is performed four times and the data to be sent is "one", then it is repeated four times as "one", "one", "one", "one". However, with spreading in general a certain spreading code can be communicated, so instead of a transmission code of "one", "one", "one", "one", a different coded pattern or codeword could be sent that is particular to each UE or group of UEs, for example, "one", "minus one", "one", "minus one". This code pattern or codeword could be known at both communication ends, transmitter and receiver. Effectively in terms of the antenna boosting, this spreading code could operate similarly as a repetition, but this is more desirable from simple repetition, which has some bad characteristics such as not being able to differentiate between codes if different UEs send the same pattern.

Utilizing a direct spreading from each UE with different multiple codes can remedy this deficiency, for example. As such, if UEs want to transmit the same data such as a "one", then the transmission can be repeated to still achieve antenna boosting, but also based on a UE specific code. For example, if UE 1 sends "one", "minus one", "one", "minus one", and UE 2 sends/transmits "one", "one", "minus one", "minus one", there is a difference that is apparent and becomes UE specific. On one hand. the effect of the spreading is an antenna boost by repetition, but also by employing a certain sequence or spreading sequence that randomizes the interference, which can help with or further enable the multi-user detection at the eNB 102.

The processing chain or system 600, includes generation of QAM symbols, which follows a serial-to-parallel conversion, and then it is directly mapped to M point DFTs, and further mapped to a certain PRBs assigned by the eNB 102 and followed by subcarrier mapping to N point to IFFT. Multiple additional block components 608 between serial-to-parallel conversion and the M point to DFT blocks (M-DFT) within the M-DFT component 614 can apply the spreading as a repetition of different codes as $C_{p,i}$. UE 1, for example, can spread to $C_{1,1}$ and UE 2 to $C_{2,1}$, etc., where (p) can represent a codeword of a number of codewords or number of different spreading sequences that are unique, and i represent the number of repetitions or spread. As a generalized example, one specific implementation can be p=1 for all spreading components 608, and thus, each codeword would be C 1, i for different numbers of repetition.

In this particular case, the spreading components 608 can affect the spreading to transmit one QAM symbol, which can be spread depending on the M-DFT size. For example, if the size of the M-DFT is 12, as in LTE, then DFT QAM size and each LTE QAM symbol is spread by the spreading sequence by a spreading vector, the spreading vector can be 12 because it is 12 times repeated, and repeated while relying on a specific code (code p). The illustration of FIG. 6 can be a generalized version and allows use of more than one code as well for UE i. As an example, if p=2 for UE 1, the first modulation symbol can also be spread by code one of length 12, and a next symbol can be spread by spreading code C 2, of which length again is 12 and those can be added at multiplexers such as the adder 610 or 612. Then effectively the spreading vector can be reduced from 12 to 6 because those two symbols can be added (e.g. at the multiplexers/adders 610, 612). This is one way to control the spreading vector and how much UEs spread their symbols or coding operations. The spreading can thus be an important parameter that determines the overall system performance and can be dependent on, for example, how many the number of simultaneous users (or UEs transmitting simultaneously) at a given time in a statistical sense. For example, if at the eNB 102 it is expected that a large number of users (UEs) are transmitting simultaneously at a given subframe or given time, then it is desirable that each user use a large spreading vector, let's say M-DFT size where M equals 100, for example. However, in contrast, if a small (or smaller) number of UEs are expected to simultaneously transmit, the eNB 102 can decrease the spreading vector and control it by the DFT size for this propose and control it by the number of spreading codes used by a given one UE. A size of the DFT module 614 or DFT blocks of the DFT module 614 for the DFT spreading operation can be equal to the number of the orthogonal codes utilized. The NOMA zone, for example, can have a size of six PRBs, and the DFT block size can be less than or equal to 72. The orthogonal codes can further comprise Zadoff-Chu sequences determined according to the following representation:

$$a_{q(n)} = \exp\left[-\frac{j2\pi q \frac{n(n+1)}{2}}{N_{ZC}}\right], \quad q = 1, \ldots,$$

$$N_{ZC} - 1 \text{ and } n = 0, \ldots, N_{ZC} - 1;$$

wherein q is a root, $N_{ZC}$ is a length of a ZC sequence wherein the length of the ZC sequence is equal to a DFT block size of the DFT module.

The NOMA zone can be within a the PUSCH or between a physical uplink control channel and a single-carrier frequency division multiple access (SC-FDMA) region, in which the SC-FDMA region is the OMA zone.

Figure 7:
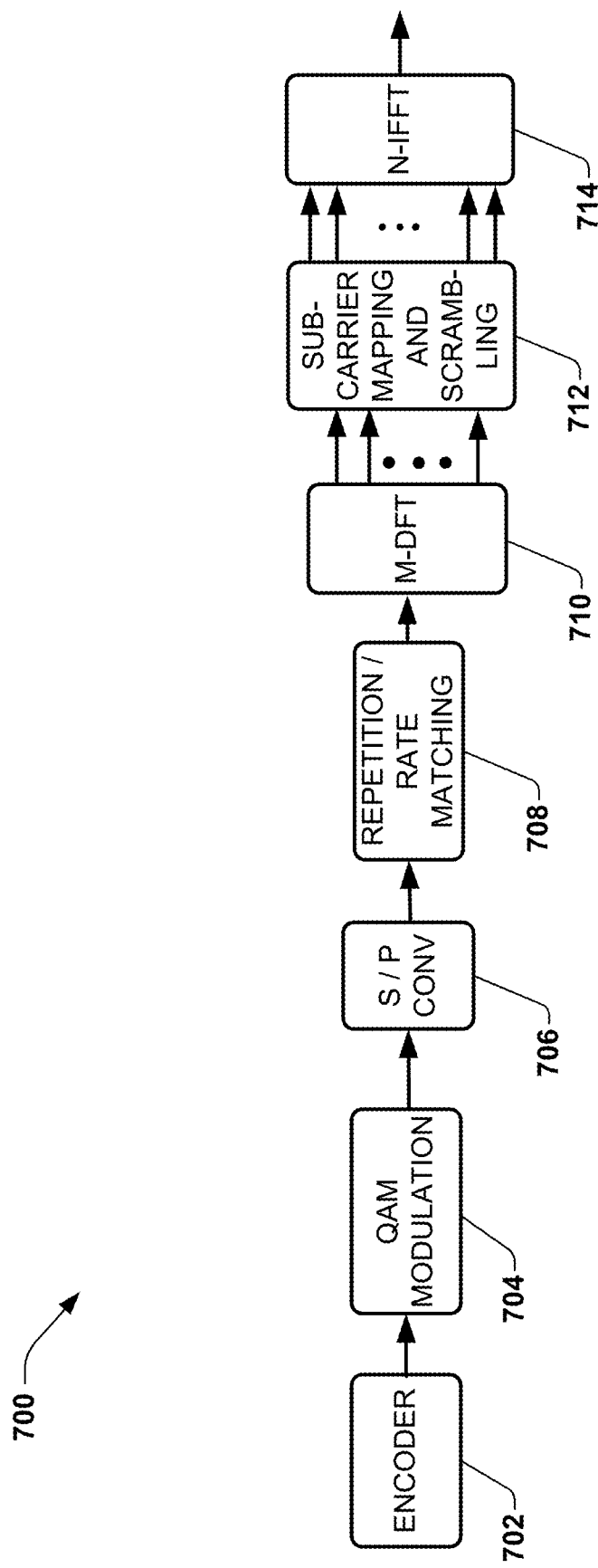
FIG. 7 illustrates an example processing pipeline for a network device for spreading options in a NOMA or OMA zone according to various aspects or embodiments.

Referring to FIG. 7, illustrated is another example of a process pipeline for spreading symbols by a network device in a NOMA zone in accordance with various embodiments. An encoder 702 connects to a QAM modulation (modulator) component 704, which outputs QAM symbols spread over p orthogonal codes to a serial to parallel conversion component 706. A repetition/rate matching component 708 can generate a spreading over the whole bandwidth by using repetition or rate matching operations. A DFT module/component 710 can perform one or more DFT spreading operations on the combined QAM symbols to obtain DFT-spread symbols The subcarrier mapping and scrambling block (or mapping component) 712 (similar in configuration and function of the component 616 of FIG. 6) can receive the repeated/rate matched symbols and provide codes mapped and scrambled by one or more unique code sequences to the N-IFFT component 714. The mapping component 712 thus maps the DFT-spread symbols to resources designated as belonging to the NOMA zone. The N-IFFT component/module then perform an IFFT spreading operation on the mapped DFT-symbols. These components, for example, can also be include or a part of baseband circuitry (e.g., 204 of FIG. 2) or other circuitry to operate in conjunction with a radio frequency (RF) circuitry (e.g., 206 of FIG. 2) or a communication interface/platform (e.g., 308 of FIG. 3) for wireless communication herein as part of or by a PHY layer, for example, or other OSI layer (e.g., MAC layer), which can also be enabled by an RF interface (not shown) that interfaces communication signals with the RF circuitry (e.g., 206) and any external component or device.

In spreading options herein, the UEs 110 or 116 can spread their symbols over the whole bandwidth, either by using repetition coding or rate matching component 708. The data symbols can be repeated or rate matched to occupy the NOMA zone partially or entirely by the repetition/rate matching component 708. Rate matching can have advantages of providing coding gain over repetition alone. However, the repetition/rate matching component 708 can operate one or both. As an example, n raw bits can be encoded using LTE turbo code of code rate ½ by the encoder component 602 and then can be repeated 6 times to form 12n bits by the repetition/rate matching component 708. Another way of sending the same is by encoding the n raw bits using LTE turbo code rate of ⅓, and then repeated 4 times to form 12n bits, which could provide more coding gain than the former option. As such, instead of re-sending a certain PRB, network devices can repeat it depending on the spreading vector (factor) desired. The desired operational spreading vector can depend on the operation scenario. When six times repetition or six times the spreading is desired, then the UEs can repeat it six times for 12 times, or repeat 12 times.

In one embodiment, spreading or antenna boosting can be realized by generating a frequency hopping operation. As illustrated for example in FIG. 4, six PRBs are allocated for a NOMA zone, although more or less could be allocated or designated as well. Each UE 110, 116, for example, could utilize all six PRBs for NOMA transmission, as illustrated. In one example, three UEs could be simultaneously transmitting and all three users use all six PRBs for transmission. Alternatively or additionally, the three UEs could rely on frequency hopping along with a partial spreading, in which UEs 1 and 2 do not use all six PRBs. Thus, UE 1, for example, can use PRB 1, 3, 5 and UE 2 can use PRB 1, 4, 6. Then the UE 3 can use PRB 2, 3, 4, for example, or another combination where some, but not all PRBs are used simultaneously by multiple UEs, and the configurations or designation of PRBs within the NOMA zone to these UEs can also be dynamically changed based on decisions by the eNB 102, for example.

As such, from a UE transmission perspective, certain PRBs collide and certain PRBs do not, and certain PRBs collide with more users, and some with less users. As such, assigning, allocating or designating PRBs to various UEs by frequency hopping can be another way for the eNB 102 to boost or improve the overall antenna transmission. In one embodiment, collision could be allowed for all the NOMA resources with partial spreading in the sense that the transmission is spread over part of the entire PRBs within the NOMA zone. Alternatively or additionally, designation could be predetermined or preconfigured between UE 110, 116 and eNB 102, and the collision can be randomized, which is another way to realize boosting of the antenna as frequency hopping.

In other embodiments, various decoding options can be utilized by the eNB 102 or the receiver side, where multiple receivers can be applied to the code for multiple user simultaneous transmission. In one example, interference can be treated or designated as noise. This means that when the eNB 102 is receiving signals from UE 1, 2, 3, then the eNB 102 first could try to decode separately UE 1, and UE 2 and 3 are treated as noise. UEs 2 and 3 could be designated as a "do not care" or negligible as part of a decoding process of the UE 1 signal by the eNB 102, such that other UEs are treated during the processing as interference. The eNB 102 then decodes the signals from one UE, while treating the signal from other UEs as noise and then repeating the same process for all the UEs individually, which are simultaneously transmitting on the same PRBs or resources of the NOMA zone.

In another embodiment, successive interference cancellation (SIC) can be utilized as another option to deduce or first determine an order of decoding based on the received SINR. The UE with the highest SINR can be decoded first, then its contribution is subtracted from the observed signal at the receiver. Then each UE thereafter can be further individually decoded in a way that subtracts the previous one or more UE signals from the decoding process (decoding iteration of the given UE). The UE with the second best SINR can be decoded and so on, until there is no interference ideally from the subsequent UE or UEs. This option can provide a better sum rate than the non-SIC option and better bit error rate (BER) performance in most cases.

In another embodiment, the eNB 102 or a network device can generate a maximum likelihood (ML) decoding. Joint decoding of the received signal from different UEs can provide an optimal performance, while providing the worst complexity as well. Certain sub-optimal decoding procedures can be employed to decrease the decoding complexity. The codes of each symbol can thus be derived from multiple UEs.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 8:
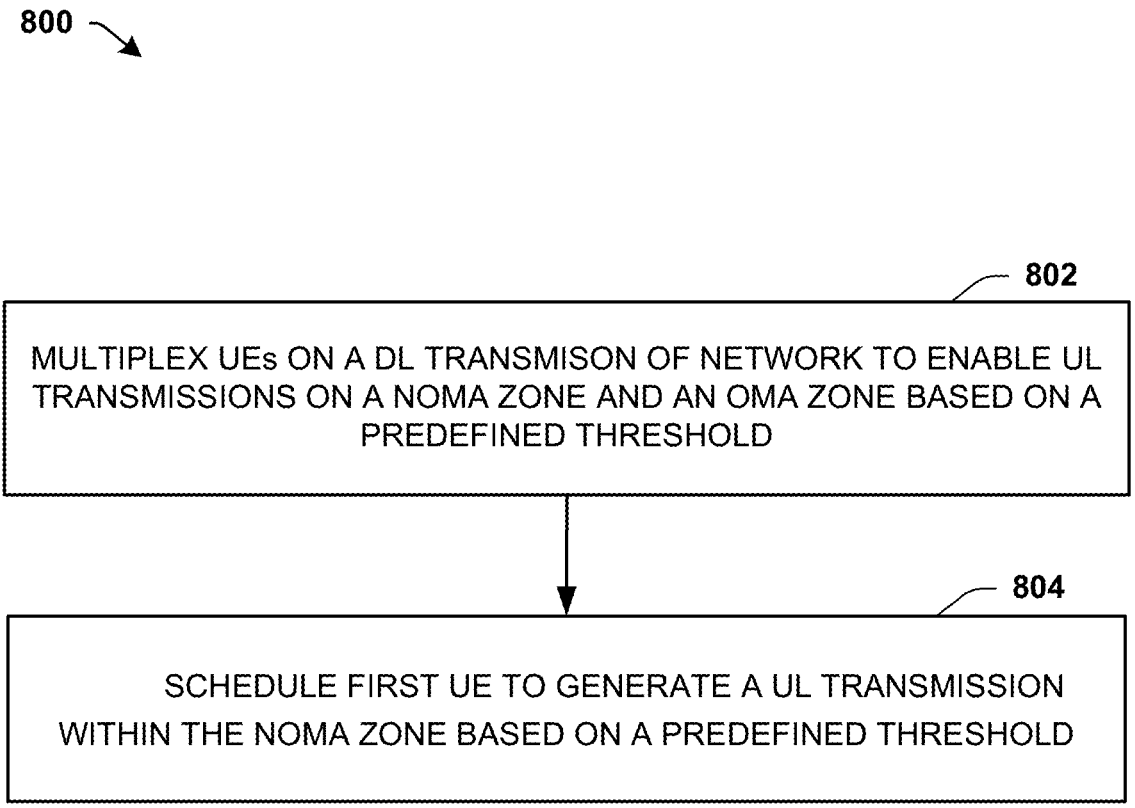
FIG. 8 illustrates an example process flow for a network device for spreading transmission options in a NOMA or OMA zone according to various aspects or embodiments.

FIG. 8 illustrates another example process flow or method 800 for generating or transmitting, processing or receiving, channel resources for transmission by the designation of different PRBs in a NOMA zone as well as an OMA zone based on a predefined threshold or other criteria.

At 802, an eNB 102, for example, can enable multiplexing UEs in a downlink transmission of an LTE network or a next generation 5G based network that enables an uplink transmission by providing PRBs as a NOMA zone and other PRBs as an OMA zone over the network.

At 804, a first UE of the plurality of UEs can be scheduled to generate the uplink transmission with the first plurality of PRBs within the NOMA zone based on a first transmission packet size or a first transmission rate satisfying a predefined threshold.

In addition, a second UE can also be scheduled (via the downlink transmission) to generate a second transmission in the NOMA zone with a same or different PRB as the first UE. The first UE and the second UE can also comprise a group ID that distinguishes a group of UEs comprising the first UE and the second UE from another group of UEs comprising other UEs over the LTE or NextGen 5G network. Alternatively, the second UE can be scheduled to generate UL transmission within the OMA zone based on the predefined threshold (e.g., an IoT threshold or the like).

The eNB (e.g., eNB 102) can receive uplink transmissions from the first UE and the second UE in the LTE or NextGen 5G network via a synchronous network connection with the same PRB based on different orthogonal codes that are substantially orthogonal to one another within the group of UEs. Additionally, the eNB 102 can receive a request for an explicit grant message generated by the first UE to change from using a first PRB of the NOMA zone to using a second PRB of the OMA zone for the uplink transmission, based on or in response to the transmission packet size or the transmission rate of packet transmission exceeding the predefined threshold.

In other embodiments, the eNB could signal the predefined threshold to the first UE via a radio resource control or RRC signaling. The eNB 102 can further decode the uplink transmission received from the first UE while designating uplink transmissions received from other UEs of the plurality of UEs as a noise. After decoding the uplink transmissions received from the first UE, the eNB 102 can decode the uplink transmissions received from a second UE of the other UEs while treating the uplink transmissions received from the other UEs and the first UE as noise. The eNB 102 can also generate an order of decoding based on received signal-to-interference-plus-noise ratios SINRs from the UEs. The order of decoding can be ordered, for example, from a greatest SINR to a lowest SINR corresponding to the of the plurality of UEs, respectively, and decoding the uplink transmissions according to the order of decoding. Alternatively or additionally, a maximum likelihood (ML) decoding of the the uplink transmissions from the plurality of UEs can be generated to decode transmissions.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed in an evolved NodeB ("eNB") comprising: one or more processors configured to: designate a first plurality of physical resource blocks ("PRBs") as a non-orthogonal multiple access ("NOMA") zone and a second plurality of PRBs as an orthogonal multiple access ("OMA") zone to enable multiplexing user equipments ("UEs") for uplink transmissions, and schedule a first UE of the UEs to generate the uplink transmissions among the first plurality of PRBs within the NOMA zone without an explicit grant message based on a first transmission packet size or a first transmission rate; and an RF interface, coupled to the one or more processors, configured to receive or transmit transmission data with an RF circuitry.

Example 2 includes the subject matter of Example 1, including or omitting optional elements, wherein the one or more processors are further configured to schedule a second UE to generate a second transmission in the OMA zone with an explicit grant message by using the second plurality of PRBs based on a contention-based protocol, and at least one of a second transmission packet size or a second transmission rate satisfying a predefined threshold.

Example 3 includes the subject matter of any one of Examples 1-2, including or omitting optional elements, wherein the one or more processors are further configured to enable the first UE to transmit data without the explicit grant message by using the first plurality of PRBs as long as the first transmission packet size of the data, or the first transmission rate of the data is smaller than a predefined threshold.

Example 4 includes the subject matter of any one of Examples 1-3, including or omitting optional elements, wherein the one or more processors are further configured to: signal the predefined threshold to the first UE via explicit signaling and as an Internet of Things ("IoT") threshold associated with an IoT standard for the first transmission packet size or the first transmission rate; and schedule the first UE to generate a different transmission in the OMA zone with an explicit grant message by using the second plurality of PRBs based on the first transmission packet size or the first transmission rate reaching or exceeding the IoT threshold.

Example 5 includes the subject matter of any one of Examples 1-4, including or omitting optional elements, wherein the one or more processors are further configured to: receive a request for the explicit grant message to enable the transmission within the OMA zone, wherein the request is based on a transmission comprising larger packets using larger resources than resources designated within the NOMA zone; and transmit an indication with the explicit grant message that the first UE is designated as being in the OMA zone based on the first transmission packet size of the data, or the first transmission rate of the data satisfying the IoT threshold.

Example 6 includes the subject matter of any one of Examples 1-5, including or omitting optional elements, wherein the request to enter the OMA zone is included in a buffer status report ("BSR").

Example 7 includes the subject matter of any one of Examples 1-6, including or omitting optional elements, wherein the one or more processors are further configured to: divide the UEs into a plurality of UE groups, coupled to ab LTE or NextGen 5G based network, with associated group identifiers ("IDs"); and assign orthogonal codes within a first UE group of the plurality of UE groups to eliminate signal interference among first UEs of the first UE group, wherein the first UEs share resources and scrambling codes based on a first group ID that identifies the first UEs from other UEs of the plurality of UE groups.

Example 8 includes the subject matter of any one of Examples 1-7, including or omitting optional elements, wherein the one or more processors are further configured to: decode the uplink transmissions received from the first UE while designating the uplink transmissions received from other UEs of the UEs as a noise; and after decoding the uplink transmissions received from the first UE, decode the uplink transmissions received from a second UE of the UEs while treating the uplink transmissions received from the other UEs of the UEs and the first UE as the noise.

Example 9 includes the subject matter of any one of Examples 1-8, including or omitting optional elements, wherein the one or more processors are further configured to: generate an order of decoding based on received signal-to-interference-plus-noise ratios ("SINRs") from the UEs, wherein the order of decoding is ordered from a greatest SINR to a lowest SINR corresponding to the UEs, respectively, and decode the uplink transmissions according to the order of decoding; or generate a maximum likelihood ("ML") decoding of the the uplink transmissions from the UEs.

Example 10 is an apparatus configured to be employed in a user equipment ("UE") comprising: one or more processors configured to: receive one or more downlink signals to schedule uplink transmissions, wherein the one or more downlink signals comprise a first plurality of physical resource blocks ("PRBs") corresponding to a non-orthogonal multiple access ("NOMA") zone and a second plurality of PRBs corresponding to an orthogonal multiple access ("OMA") zone of the LTE or NextGen 5G network for an uplink transmission; determine whether to generate the uplink transmission within the NOMA zone or the OMA zone based on at least one of: a transmission packet size or a transmission rate; and a communication interface, coupled to the one or more processors, configured to receive or transmit communication transmissions.

Example 11 includes the subject matter of Example 10, wherein the one or more processors are further configured to: determine whether to generate the uplink transmission within the NOMA zone or the OMA zone, based on an OMA zone indication that is received or based on a determination that the transmission packet size or the transmission rate satisfies a threshold that is received via one or more system information blocks ("SIBs").

Example 12 includes the subject matter of any one of Examples 10-11, including or omitting optional elements, wherein the one or more processors are further configured to: measure an energy level in the NOMA zone prior to transmission of the uplink transmission; when the measured energy level is less than a predefined threshold, initiate the uplink transmission with any PRB within the NOMA zone; and when the measured energy level is greater than the predefined threshold, measure the energy level of the NOMA zone after a backoff period as part of a listen before talk protocol.

Example 13 includes the subject matter of any one of Examples 10-12, including or omitting optional elements, wherein the one or more processors are further configured to: generate an orthogonal code to transmit on a same set of resources among a group of UEs with a same group identifier, wherein the same set of resources comprises a PRB of the first plurality of PRBs corresponding to the NOMA zone; spread one or more quadrature amplitude modulation ("QAM") symbols based on the orthogonal code across the first plurality of PRBs; combine the spread QAM symbols; perform a discrete fourier transformation ("DFT") spreading operation on the combined QAM symbols to obtain DFT-spread symbols; map the DFT-spread symbols across one or more PRBs of the first plurality of PRBs corresponding to the NOMA zone; and perform an Inverse fast fourier transform ("IFFT") spreading operation on the mapped DFT-spread symbols.

Example 14 includes the subject matter of any one of Examples 10-13, including or omitting optional elements, wherein the one or more processors are further configured to: spread data symbols among the first plurality of PRBs over the NOMA zone based on at least one of: a rate matching or a repetition, of the data symbols.

Example 15 includes the subject matter of any one of Examples 10-14, including or omitting optional elements, wherein the one or more processors are further configured to: perform a frequency hopping operation with a designated set of PRBs among the first plurality of PRBs by using a set of first allocated PRBs of the designated set of PRBs to generate the uplink transmission and afterwards using a second allocated resources of the designated set of PRBs that are different from the first allocated resources to generate another uplink transmission without an explicit grant message.

Example 16 includes the subject matter of any one of Examples 10-15, including or omitting optional elements, wherein the one or more processors are further configured to: generate a contention based physical uplink shared channel operation based on a sharing of an assigned subset of the first plurality of PRBs that is assigned to other UEs with a same group identifier ("ID"), wherein the first plurality of PRBs of the NOMA zone comprise non-contiguous PRBs distributed over a transmission bandwidth.

Example 17 includes the subject matter of any one of Examples 10-16, including or omitting optional elements, wherein the one or more processors are further configured to: communicate a request to initiate communications in the OMA zone from the NOMA zone, wherein the request is based on a transmission of larger packets using larger resources than resources designated as being in the NOMA zone; and after receiving an explicit grant message based on the request, transmit data with a PRB of the second plurality of PRBs corresponding to the OMA zone.

Example 18 includes the subject matter of any one of Examples 10-17, including or omitting optional elements, wherein the one or more processors are further configured to communicate the request in a buffer status report ("BSR") and use orthogonal codes to transmit on a same set of PRBs as other UEs identified in a same UE group corresponding to a same group ID that distinguishes the same UE group from other UE groups over an LTE or NextGen 5G network (e.g., 5G based/capable network).

Example 19 is a computer-readable medium storing executable instructions that, in response to execution, cause one or more processors of an evolved NodeB ("eNB") to perform operations, comprising: multiplexing a plurality of user equipments ("UEs") in a downlink transmission that enables an uplink transmission by providing a first plurality of physical resource blocks ("PRBs") as a non-orthogonal multiple access ("NOMA") zone and a second plurality of PRBs as an orthogonal multiple access ("OMA") zone over the LTE or NextGen 5G network; and scheduling a first UE of the plurality of UEs to generate the uplink transmission with the first plurality of PRBs within the NOMA zone based on a first transmission packet size or a first transmission rate satisfying a predefined threshold.

Example 20 includes the subject matter of Example 19, wherein the operations further comprise: scheduling a second UE to generate a second transmission in the NOMA zone with a same PRB as the first UE, wherein the first UE and the second UE comprise a group identifier ("ID") that distinguishes a group of UEs comprising the first UE and the second UE from another group of UEs comprising other UEs over an LTE or NextGen 5G network; and receiving uplink transmissions from the first UE and the second UE in the LTE or NextGen 5G network via a synchronous network connection with the same PRB based on different orthogonal codes that are substantially orthogonal to one another within the group of UEs.

Example 21 includes the subject matter of any one of Examples 19-20, including or omitting optional elements, wherein the operations further comprise: receiving a request for an explicit grant message to change from using a first PRB of the NOMA zone to using a second PRB of the OMA zone for the uplink transmission, based on the transmission packet size or the transmission rate exceeding the predefined threshold, wherein the predefined threshold comprises a threshold related to an IoT standard.

Example 22 includes the subject matter of any one of Examples 19-21, including or omitting optional elements wherein the operations further comprise: signaling the predefined threshold to the first UE via a radio resource control ("RRC") signaling, wherein the predefined threshold comprises an Internet of Things ("IoT") threshold associated with an IoT standard for the first transmission packet size or the first transmission rate.

Example 23 includes the subject matter of any one of Examples 19-22, including or omitting optional elements, wherein the operations further comprise: decoding the uplink transmission received from the first UE while designating uplink transmissions received from other UEs of the plurality of UEs as a noise; and after decoding the uplink transmission received from the first UE, decoding the uplink transmissions received from a second UE of the other UEs while treating the uplink transmissions received from the other UEs and the first UE as the noise.

Example 24 includes the subject matter of any one of Examples 19-23, including or omitting optional elements, wherein the operations further comprise: generating an order of decoding based on received signal-to-interference-plus-noise ratios ("SINRs") from the of the plurality of UEs, wherein the order of decoding is ordered from a greatest SINR to a lowest SINR corresponding to the of the plurality of UEs, respectively, and decoding the uplink transmissions according to the order of decoding.

Example 25 includes the subject matter of any one of Examples 19-24, including or omitting optional elements, wherein the operations further comprise: generating a maximum likelihood (ML) decoding of the the uplink transmissions from the plurality of UEs.

Example 26 is a computer-readable medium storing executable instructions that, in response to execution, cause one or more processors of a user equipment ("UE") to perform operations, comprising: scheduling an uplink transmission based on a downlink signal, wherein the downlink signal comprises a first plurality of physical resource blocks ("PRBs") corresponding to a non-orthogonal multiple access ("NOMA") zone and a second plurality of PRBs corresponding to an orthogonal multiple access ("OMA") zone of the LTE or NextGen 5G network; and determining whether to generate the uplink transmission within the NOMA zone or the OMA zone based on at least one of: a transmission packet size or a transmission rate.

Example 27 includes the subject matter of Examples 26, wherein the operations further comprise: determining whether to generate the uplink transmission within the NOMA zone or the OMA zone, based on an OMA zone indication that is received, or based on a determination that the transmission packet size or the transmission rate satisfies a threshold received via one or more system information blocks ("SIBs").

Example 28 includes the subject matter of any one of Examples 26-27, including or omitting optional elements, wherein the operations further comprise: measuring an energy level in the NOMA zone prior to transmission of the uplink transmission; initiating, when the measured energy is less than a predefined threshold, the uplink transmission with any PRB within the NOMA zone; and measuring, when the measured energy level is greater than the predefined threshold, the energy level of the NOMA zone after a backoff period as part of a listen before talk process.

Example 29 includes the subject matter of any one of Examples 26-28, including or omitting optional elements, wherein the operations further comprise: generating an orthogonal code to transmit on a same set of resources among a group of UEs with a same group identifier, wherein the same set of resources comprises a PRB of the first plurality of PRBs corresponding to the NOMA zone; spreading one or more quadrature amplitude modulation ("QAM") symbols based on the orthogonal code across the first plurality of PRBs; combining the spread QAM symbols; performing a discrete fourier transformation ("DFT") spreading operation on the combined QAM symbols to obtain DFT-spread symbols; mapping the DFT-spread symbols across the first plurality of PRBs corresponding to the NOMA zone; and performing an Inverse fast fourier transform ("IFFT") spreading operation on the mapped DFT-symbols.

Example 30 includes the subject matter of any one of Examples 26-29, including or omitting optional elements, wherein the operations further comprise: spreading data symbols among the first plurality of PRBs over the NOMA zone based on at least one of: a rate matching or a repetition, of the data symbols.

Example 31 includes the subject matter of any one of Examples 26-30, including or omitting optional elements, wherein the operations further comprise: performing a frequency hopping operation with a designated set of PRBs among the first plurality of PRBs by using a set of first allocated PRBs of the designated set of PRBs to generate the uplink transmission and afterwards using a second allocated resource of the designated set of PRBs that are different from the first allocated resources to generate another uplink transmission without an explicit grant message.

Example 32 includes the subject matter of any one of Examples 26-31, including or omitting optional elements, wherein the operations further comprise: generating a contention based physical uplink shared channel operation based on a sharing of an assigned subset of the first plurality of PRBs that is assigned to another UE with a same group identifier ("ID"), wherein the first plurality of PRBs of the NOMA zone comprise non-contiguous PRBs distributed over a transmission bandwidth.

Example 33 includes the subject matter of any one of Examples 26-32, including or omitting optional elements, wherein the operations further comprise: communicating a request to initiate communications in the OMA zone from the NOMA zone, wherein the request is based on a transmission of larger packets using larger resources than resources corresponding to the NOMA zone; and after receiving an explicit grant message based on the request, transmit data with a PRB of the second plurality of PRBs corresponding to the OMA zone.

Example 34 includes the subject matter of any one of Examples 26-33, including or omitting optional elements, wherein the operations further comprise: communicating the request in a buffer status report ("BSR") and use orthogonal codes to transmit on a same set of PRBs as other UEs identified in a same UE group corresponding to a same group ID that distinguishes the same UE group from other UE groups over the LTE or NextGen 5G network.

Example 35 is an apparatus of an evolved NodeB ("eNB"), comprising: means for multiplexing a plurality of user equipments ("UEs") in a downlink transmission that enables an uplink transmission by providing a first plurality of physical resource blocks ("PRBs") as a non-orthogonal multiple access ("NOMA") zone and a second plurality of PRBs as an orthogonal multiple access ("OMA") zone; and means for scheduling a first UE of the plurality of UEs to generate the uplink transmission with the first plurality of PRBs within the NOMA zone based on a first transmission packet size or a first transmission rate satisfying a predefined threshold.

Example 36 includes the subject matter of Example 35, further comprising: means for scheduling a second UE to generate a second transmission in the NOMA zone with a same PRB as the first UE, wherein the first UE and the second UE comprise a group identifier ("ID") that distinguishes a group of UEs comprising the first UE and the second UE from another group of UEs comprising other UEs over the LTE or NextGen 5G network; and means for receiving uplink transmissions from the first UE and the second UE in the LTE or NextGen 5G network via a synchronous network connection with the same PRB based on different orthogonal codes that are substantially orthogonal to one another within the group of UEs.

Example 37 includes the subject matter of any one of Examples 35-36, including or omitting optional elements, further comprising: means for receive a request for an explicit grant message to change from using a first PRB of the NOMA zone to using a second PRB of the OMA zone for the uplink transmission, based on the transmission packet size or the transmission rate exceeding the predefined threshold, wherein the predefined threshold comprises a threshold related to an IoT standard.

Example 38 includes the subject matter of any one of Examples 35-37, including or omitting optional elements, further comprising: means for signaling the predefined threshold to the first UE via a radio resource control ("RRC") signaling, wherein the predefined threshold comprises an Internet of Things ("IoT") threshold associated with an IoT standard for the first transmission packet size or the first transmission rate.

Example 39 includes the subject matter of any one of Examples 35-38, including or omitting optional elements, further comprising: means for decoding the uplink transmission received from the first UE while designating uplink transmissions received from other UEs of the plurality of UEs as a noise; and means for decoding, after decoding the uplink transmission received from the first UE, the uplink transmissions received from a second UE of the other UEs while treating the uplink transmissions received from the other UEs and the first UE as the noise.

Example 40 includes the subject matter of any one of Examples 35-39, including or omitting optional elements, further comprising: means for generating an order of decoding based on received signal-to-interference-plus-noise ratios ("SINRs") from the of the plurality of UEs, wherein the order of decoding is ordered from a greatest SINR to a lowest SINR corresponding to the of the plurality of UEs, respectively, and decoding the uplink transmissions according to the order of decoding.

Example 41 includes the subject matter of any one of Examples 35-40, including or omitting optional elements, further comprising: means for generating a maximum likelihood (ML) decoding of the the uplink transmissions from the plurality of UEs.

Example 42 is an apparatus of a user equipment ("UE"), comprising: means for scheduling an uplink transmission based on a downlink signal, wherein the downlink signal comprises a first plurality of physical resource blocks ("PRBs") corresponding to a non-orthogonal multiple access ("NOMA") zone and a second plurality of PRBs corresponding to an orthogonal multiple access ("OMA") zone; and means for determining whether to generate the uplink transmission within the NOMA zone or the OMA zone based on at least one of: a transmission packet size or a transmission rate.

Example 43 includes the subject matter of Example 42, further comprising: means for determining whether to generate the uplink transmission within the NOMA zone or the OMA zone, based on an OMA zone indication that is received, or based on a determination that the transmission packet size or the transmission rate satisfies a threshold received via one or more system information blocks ("SIBs").

Example 44 includes the subject matter of any one of Examples 42-43, including or omitting optional elements, further comprising: means for measuring an energy level in the NOMA zone prior to transmission of the uplink transmission; means for initiating, when the measured energy is less than a predefined threshold, the uplink transmission with any PRB within the NOMA zone; and means for measuring, when the measured energy level is greater than the predefined threshold, the energy level of the NOMA zone after a backoff period as part of a listen before talk process.

Example 45 includes the subject matter of any one of Examples 42-44, including or omitting optional elements, further comprising: means for generating an orthogonal code to transmit on a same set of resources among a group of UEs with a same group identifier, wherein the same set of resources comprises a PRB of the first plurality of PRBs corresponding to the NOMA zone; means for spreading one or more quadrature amplitude modulation ("QAM") symbols based on the orthogonal code across the first plurality of PRBs; means for combining the spread QAM symbols; means for performing a discrete fourier transformation ("DFT") spreading operation on the combined QAM symbols to obtain DFT-spread symbols; means for mapping the DFT-spread symbols across the first plurality of PRBs corresponding to the NOMA zone; and means for performing an Inverse fast fourier transform ("IFFT") spreading operation on the mapped DFT-symbols.

Example 46 includes the subject matter of any one of Examples 42-45, including or omitting optional elements, further comprising: means for spreading data symbols among the first plurality of PRBs over the NOMA zone based on at least one of: a rate matching or a repetition, of the data symbols.

Example 47 includes the subject matter of any one of Examples 42-46, including or omitting optional elements, further comprising: means for performing a frequency hopping operation with a designated set of PRBs among the first plurality of PRBs by using a set of first allocated PRBs of the designated set of PRBs to generate the uplink transmission and afterwards using a second allocated resource of the designated set of PRBs that are different from the first allocated resources to generate another uplink transmission without an explicit grant message.

Example 48 includes the subject matter of any one of Examples 42-47, including or omitting optional elements, further comprising: means for generating a contention based physical uplink shared channel operation based on a sharing of an assigned subset of the first plurality of PRBs that is assigned to another UE with a same group identifier ("ID"), wherein the first plurality of PRBs of the NOMA zone comprise non-contiguous PRBs distributed over a transmission bandwidth.

Example 49 includes the subject matter of any one of Examples 42-48, including or omitting optional elements, further comprising: means for communicating a request to initiate communications in the OMA zone from the NOMA zone, wherein the request is based on a transmission of larger packets using larger resources than resources corresponding to the NOMA zone; and after receiving an explicit grant message based on the request, transmit data with a PRB of the second plurality of PRBs corresponding to the OMA zone.

Example 50 includes the subject matter of any one of Examples 42-49, including or omitting optional elements, further comprising: means for communicating the request in a buffer status report ("BSR") and use orthogonal codes to transmit on a same set of PRBs as other UEs identified in a same UE group corresponding to a same group ID that distinguishes the same UE group from other UE groups over the LTE or NextGen 5G network.

Example 51 is an apparatus of a network device as a user equipment ("UE") or an evolved nodeB ("eNB") comprising: radio frequency ("RF") circuitry to provide a cell for wireless communication; and baseband circuitry coupled with RF circuitry, the baseband circuitry configured to: determine based on one or more signals received or generated, a set of physical resource blocks ("PRBs") designated as a non-orthogonal multiple access ("NOMA") zone; and control the RF circuitry to transmit data or receive the data using at least a portion of the set of PRBs within the NOMA zone without an explicit uplink grant message.

Example 52 includes the subject matter of Examples 51, including or omitting optional elements, wherein the data to be transmitted or received without an explicit uplink grant message using the designated set of PRBs have at least one of: a packet size or a transmission rate that is smaller than a threshold.

Example 53 includes the subject matter of any one of Examples 51-52, including or omitting optional elements, wherein the baseband circuitry is further configured to: control the RF circuitry to transmit or receive a request to enter an orthogonal multiple access ("OMA") zone, wherein the request is to request transmission of larger packets using larger resources than resources designated as being in the NOMA zone; and control the RF circuitry to receive an indication indicating transmissions in the OMA zone are permitted; and upon receipt or transmit of an explicit uplink grant message, control the RF circuitry to transmit data within the OMA zone using at least one PRB that is different than the PRBs in the designated set of PRBs as being in the NOMA zone.

Example 54 includes the subject matter of any one of Examples 51-53, including or omitting optional elements, wherein the request to enter the OMA zone is included in or is otherwise associated with a Buffer Status Report ("BSR").

Example 55 includes the subject matter of any one of Examples 51-54, including or omitting optional elements, wherein the designated set of PRBs of the NOMA zone is a set of non-contiguous PRBs distributed over a transmission bandwidth of a cell provided by the eNB or received by the UE.

Example 56 includes the subject matter of any one of Examples 51-55, including or omitting optional elements, wherein the baseband circuitry is further configured to: control the RF circuitry to measure energy in the NOMA zone prior to transmission or reception of the data in the NOMA zone; determine whether the measured energy is less than a predefined threshold; and when the measured energy is determined to be less than the predefined threshold, initiating or causing to initiate transmission of the data in the NOMA zone, or when the measured energy is determined to be greater than the predefined threshold, control the RF circuitry to measure energy in the NOMA zone after a backoff period.

Example 57 includes the subject matter of any one of Examples 51-56, including or omitting optional elements wherein the backoff period is one of a first backoff period having a randomly set length of time or a second backoff period having a fixed length of time.

Example 58 includes the subject matter of any one of Examples 51-57, including or omitting optional elements wherein the baseband circuitry is further configured to control the RF circuitry to receive an assigned set of resources within the NOMA zone, wherein the set of resources within the NOMA zone include at least a portion of a PRB of the designated set of PRBs.

Example 59 includes the subject matter of any one of Examples 51-58, including or omitting optional elements wherein the baseband circuitry further comprises: a quadrature amplitude modulation ("QAM") modulator to spread one or more QAM symbols using a corresponding one of orthogonal codes; a multiplexer to combine each of the one or more QAM symbols; a discrete fourier transformation ("DFT") module to perform a DFT spreading operation on the combined QAM symbols to obtain DFT-spread symbols; a mapping module to map the DFT-spread symbols to resources designated as belonging to the NOMA zone; and an inverse fast fourier transform ("IFFT") module to perform an IFFT spreading operation on the mapped DFT-symbols.

Example 60 includes the subject matter of any one of Examples 51-59, including or omitting optional elements, wherein a size of the DFT module or DFT blocks of the DFT module for the DFT spreading operation is equal to a number of the orthogonal codes.

Example 61 includes the subject matter of any one of Examples 51-60, including or omitting optional elements, wherein the NOMA zone has a size of six PRBs, and the DFT block size is less than or equal to 72.

Example 62 includes the subject matter of any one of Examples 51-61, including or omitting optional elements wherein the orthogonal codes comprise Zadoff-Chu ("ZC") sequences determined according to:

$$a_{q(n)} = \exp\left[-\frac{j2\pi qn(n+1)/2}{N_{ZC}}\right], \ q = 1, \ldots, N_{ZC}-1 \text{ and } n = 0, \ldots, N_{ZC}-1;$$

wherein q is a root, $N_{ZC}$ is a length of a ZC sequence wherein the length of the ZC sequence is equal to a DFT block size of the DFT module.

Example 63 includes the subject matter of any one of Examples 51-62, including or omitting optional elements wherein the NOMA zone is within a Physical Uplink Shared Channel ("PUSCH") and/or between a Physical Uplink Control Channel ("PUCCH") and a Single-Carrier Frequency Division Multiple Access ("SC-FDMA") region.

Example 64 includes the subject matter of any one of Examples 51-63, including or omitting optional elements wherein the SC-FDMA region comprises the OMA zone.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDML, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in an evolved NodeB ("eNB") comprising:
one or more processors configured to:
designate a first plurality of physical resource blocks ("PRBs") as a non-orthogonal multiple access ("NOMA") zone and a second plurality of PRBs as an orthogonal multiple access ("OMA") zone to enable multiplexing user equipments ("UEs") for uplink transmissions;

schedule a first UE of the UEs to generate the uplink transmissions among the first plurality of PRBs within the NOMA zone without an explicit grant message based on a first transmission packet size or a first transmission rate;

enable the first UE to transmit data without the explicit grant message by using the first plurality of PRBs as long as the first transmission packet size of the data, or the first transmission rate of the data is smaller than a predefined threshold;

signal the predefined threshold to the first UE via explicit signaling and as an Internet of Things ("IoT") threshold associated with an IoT standard for the first transmission packet size or the first transmission rate; and schedule the first UE to generate a different transmission in the OMA zone with an explicit grant message by using the second plurality of PRBs based on the first transmission packet size or the first transmission rate reaching or exceeding the IoT threshold; and a radio frequency (RF) interface, coupled to the one or more processors, configured to receive or transmit transmission data with an RF circuitry.

2. The apparatus of claim 1, wherein the one or more processors are further configured to schedule a second UE to generate a second transmission in the OMA zone with an explicit grant message by using the second plurality of PRBs based on a contention-based protocol, and at least one of a second transmission packet size or a second transmission rate satisfying a predefined threshold.

3. The apparatus of claim 1, wherein the one or more processors are further configured to:

receive a request for the explicit grant message to enable the transmission within the OMA zone, wherein the request is based on a transmission comprising larger packets using larger resources than resources designated within the NOMA zone; and transmit an indication with the explicit grant message that the first UE is designated as being in the OMA zone based on the first transmission packet size of the data, or the first transmission rate of the data satisfying the IoT threshold.

4. The apparatus of claim 1, wherein the request to enter the OMA zone is included in a buffer status report ("BSR").

5. The apparatus of claim 1, wherein the one or more processors are further configured to:

divide the UEs into a plurality of UE groups, coupled to a long term evolution ("LTE") or next generation ("NextGen") 5G based network, with associated group identifiers ("IDs"); and assign orthogonal codes within a first UE group of the plurality of UE groups to eliminate signal interference among first UEs of the first UE group, wherein the first UEs share resources and scrambling codes based on a first group ID that identifies the first UEs from other UEs of the plurality of UE groups.

6. The apparatus of claim 1, wherein the one or more processors are further configured to:

decode the uplink transmissions received from the first UE while designating the uplink transmissions received from other UEs of the UEs as a noise; and after decoding the uplink transmissions received from the first UE, decode the uplink transmissions received from a second UE of the UEs while treating the uplink transmissions received from the other UEs of the UEs and the first UE as the noise.

7. The apparatus of claim 1, wherein the one or more processors are further configured to:

generate an order of decoding based on received signal-to-interference-plus-noise ratios ("SINRs") from the UEs, wherein the order of decoding is ordered from a greatest SINR to a lowest SINR corresponding to the UEs, respectively, and decode the uplink transmissions according to the order of decoding; or generate a maximum likelihood ("ML") decoding of the the uplink transmissions from the UEs.

8. An apparatus configured to be employed in a user equipment ("UE") comprising:

one or more processors configured to:

receive one or more downlink signals to schedule uplink transmissions, wherein the one or more downlink signals comprise a first plurality of physical resource blocks ("PRBs") corresponding to a non-orthogonal multiple access ("NOMA") zone and a second plurality of PRBs corresponding to an orthogonal multiple access ("OMA") zone for an uplink transmission;

determine whether to generate the uplink transmission within the NOMA zone or the OMA zone based on at least one of: a transmission packet size or a transmission rate;

perform a frequency hopping operation with a designated set of PRBs among the first plurality of PRBs by using a set of first allocated PRBs of the designated set of PRBs to generate the uplink transmission and afterwards using one or more second allocated resources of the designated set of PRBs that are different from the first allocated resources to generate another uplink transmission without an explicit grant message; and a communication interface, coupled to the one or more processors, configured to receive or transmit communication transmissions.

9. The apparatus of claim 8, wherein the one or more processors are further configured to:

determine whether to generate the uplink transmission within the NOMA zone or the OMA zone, based on an OMA zone indication that is received or based on a determination that the transmission packet size or the transmission rate satisfies a threshold that is received via one or more system information blocks ("SIBs").

10. The apparatus of claim 8, wherein the one or more processors are further configured to:

measure an energy level in the NOMA zone prior to transmission of the uplink transmission;

when the measured energy level is less than a predefined threshold, initiate the uplink transmission with any PRB within the NOMA zone; and when the measured energy level is greater than the predefined threshold, measure the energy level of the NOMA zone after a backoff period as part of a listen before talk protocol.

11. The apparatus of claim 8, wherein the one or more processors are further configured to:

generate an orthogonal code to transmit on a same set of resources among a group of UEs with a same group identifier, wherein the same set of resources comprises a PRB of the first plurality of PRBs corresponding to the NOMA zone;

spread one or more quadrature amplitude modulation ("QAM") symbols based on the orthogonal code across the first plurality of PRBs;
combine the spread QAM symbols;
perform a discrete fourier transformation ("DFT") spreading operation on the combined QAM symbols to obtain DFT-spread symbols;
map the DFT-spread symbols across one or more PRBs of the first plurality of PRBs corresponding to the NOMA zone; and
perform an Inverse fast fourier transform ("IFFT") spreading operation on the mapped DFT-symbols.

12. The apparatus of claim 8, wherein the one or more processors are further configured to:
spread data symbols among the first plurality of PRBs over the NOMA zone based on at least one of: a rate matching or a repetition, of the data symbols.

13. The apparatus of claim 8, wherein the one or more processors are further configured to:
generate a contention based physical uplink shared channel operation based on a sharing of an assigned subset of the first plurality of PRBs that is assigned to other UEs with a same group identifier ("ID"), wherein the first plurality of PRBs of the NOMA zone comprise non-contiguous PRBs distributed over a transmission bandwidth.

14. The apparatus of claim 8, wherein the one or more processors are further configured to:
communicate a request to initiate communications in the OMA zone from the NOMA zone, wherein the request is based on a transmission of larger packets using larger resources than resources designated as being in the NOMA zone; and
after receiving an explicit grant message based on the request, transmit data with a PRB of the second plurality of PRBs corresponding to the OMA zone.

15. The apparatus of claim 14, wherein the one or more processors are further configured to communicate the request in a buffer status report ("BSR") and use orthogonal codes to transmit on a same set of PRBs as other UEs identified in a same UE group corresponding to a same group ID that distinguishes the same UE group from other UE groups over a long term evolution ("LTE") or next generation ("NextGen") 5G network.

16. A non-transitory computer-readable medium storing executable instructions that, in response to execution, cause one or more processors of an evolved NodeB ("eNB") to perform operations, comprising:
multiplexing a plurality of user equipments ("UEs") in a downlink transmission that enables an uplink transmission by providing a first plurality of physical resource blocks ("PRBs") as a non-orthogonal multiple access ("NOMA") zone and a second plurality of PRBs as an orthogonal multiple access ("OMA") zone;
scheduling a first UE of the plurality of UEs to generate the uplink transmission with the first plurality of PRBs within the NOMA zone based on a first transmission packet size or a first transmission rate satisfying a predefined threshold; and
receiving a request for an explicit grant message to change from using a first PRB of the NOMA zone to using a second PRB of the OMA zone for the uplink transmission, based on the transmission packet size or the transmission rate exceeding the predefined threshold, wherein the predefined threshold comprises a threshold related to an IoT standard.

17. The non-transitory computer-readable medium of claim 16, wherein the operations further comprise:
scheduling a second UE to generate a second transmission in the NOMA zone with a same PRB as the first UE, wherein the first UE and the second UE comprise a group identifier ("ID") that distinguishes a group of UEs comprising the first UE and the second UE from another group of UEs comprising other UEs over a long term evolution ("LTE") or next generation ("NextGen") 5G based network; and
receiving uplink transmissions from the first UE and the second UE in the LTE or NextGen 5G network via a synchronous network connection with the same PRB based on different orthogonal codes that are substantially orthogonal to one another within the group of UEs.

18. The non-transitory computer-readable medium of claim 16, wherein the operations further comprise:
signaling the predefined threshold to the first UE via a radio resource control ("RRC") signaling, wherein the predefined threshold comprises an Internet of Things ("IoT") threshold associated with an IoT standard for the first transmission packet size or the first transmission rate.

19. The non-transitory computer-readable medium of claim 16, wherein the operations further comprise:
decoding the uplink transmission received from the first UE while designating uplink transmissions received from other UEs of the plurality of UEs as a noise; and
after decoding the uplink transmission received from the first UE, decoding the uplink transmissions received from a second UE of the other UEs while treating the uplink transmissions received from the other UEs and the first UE as the noise.

20. The non-transitory computer-readable medium of claim 16, wherein the operations further comprise:
generating an order of decoding based on received signal-to-interference-plus-noise ratios ("SINRs") from the of the plurality of UEs, wherein the order of decoding is ordered from a greatest SINR to a lowest SINR corresponding to the of the plurality of UEs, respectively, and decoding the uplink transmissions according to the order of decoding.

21. The non-transitory computer-readable medium of claim 16, wherein the operations further comprise:
generating a maximum likelihood (ML) decoding of the the uplink transmissions from the plurality of UEs.

* * * * *